United States Patent
Ahn et al.

(10) Patent No.: US 9,905,173 B2
(45) Date of Patent: Feb. 27, 2018

(54) LIQUID CRYSTAL DISPLAY AND METHOD FOR DRIVING THE SAME

(71) Applicant: Samsung Display Co., Ltd., Yongin (KR)

(72) Inventors: Kuk-Hwan Ahn, Hwaseong-si (KR); Jai-Hyun Koh, Hwaseong-si (KR); Jin Pil Kim, Suwon-si (KR); Kyung Su Lee, Ansan-si (KR); Ik Soo Lee, Seoul (KR); Nam Jae Lim, Gwacheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 111 days.

(21) Appl. No.: 14/328,240

(22) Filed: Jul. 10, 2014

(65) Prior Publication Data

US 2015/0170590 A1    Jun. 18, 2015

(30) Foreign Application Priority Data

Dec. 13, 2013  (KR) .................. 10-2013-0155780

(51) Int. Cl.
G09G 3/36       (2006.01)

(52) U.S. Cl.
CPC ......... *G09G 3/3614* (2013.01); *G09G 3/3607* (2013.01); *G09G 2310/065* (2013.01); *G09G 2320/0204* (2013.01)

(58) Field of Classification Search
None
See application file for complete search history.

(56) References Cited

U.S. PATENT DOCUMENTS

| | | | |
|---|---|---|---|
| 6,552,707 B1 | 4/2003 | Fujiyoshi | |
| 7,724,224 B2 | 5/2010 | Kwon et al. | |
| 8,264,656 B2 | 9/2012 | Lee et al. | |
| 9,183,799 B2 * | 11/2015 | Hotelling | G09G 3/3614 |
| 2006/0202927 A1 * | 9/2006 | Lee | G02F 1/1368 345/88 |
| 2006/0208984 A1 * | 9/2006 | Kim | G09G 3/3648 345/90 |
| 2007/0069214 A1 | 3/2007 | Lee | |

(Continued)

FOREIGN PATENT DOCUMENTS

| | | |
|---|---|---|
| JP | 2011-209453 | 10/2011 |
| KR | 1020080001052 | 1/2008 |

(Continued)

*Primary Examiner* — Kenneth B Lee, Jr.
(74) *Attorney, Agent, or Firm* — H.C. Park & Associates, PLC

(57) ABSTRACT

A liquid crystal display and a method for driving the same. The liquid crystal display includes: gate lines arranged in a row direction; data lines arranged in a column direction; and subpixels arranged in basic units of eight subpixels. Each subpixel is each connected to one of the gate lines and one of the data lines, and the subpixels are continuously arranged along a row and are arranged in a matrix. In the basic units, polarities between adjacent subpixels from a first subpixel to a fourth subpixel along the row are opposite to each other, polarities between adjacent subpixels from a fifth subpixel to an eighth subpixel along the row are opposite to each other, and polarities of the fourth subpixel and the fifth subpixel are the same.

7 Claims, 28 Drawing Sheets

(56) References Cited

U.S. PATENT DOCUMENTS

| | | |
|---|---|---|
| 2008/0158131 A1 | 7/2008 | Park et al. |
| 2010/0002021 A1 | 1/2010 | Hashimoto et al. |
| 2010/0073617 A1 | 3/2010 | Han |
| 2011/0012887 A1 | 1/2011 | Lee et al. |
| 2011/0134103 A1 | 6/2011 | Nam et al. |
| 2014/0232624 A1 | 8/2014 | Kim et al. |

FOREIGN PATENT DOCUMENTS

| | | |
|---|---|---|
| KR | 1020110077899 | 7/2011 |
| KR | 1020140103588 | 8/2014 |

\* cited by examiner

|    | D1 | D2 | D3 | D4 | D5 | D6 | D7 | D8 | D9 |
|----|----|----|----|----|----|----|----|----|----|
|    | +a | +b | -c | -d | +a | +b | -c | -d |    |
|    | +c | +d | -a | -b | +c | +d | -a | -b |    |
|    | +a | -b | -c | +d | +a | -b | -c | +d |    |
|    | +c | -d | -a | +b | +c | -d | -a | +b |    |

FIG. 25

| D1 | D2 | D3 | D4 | D5 | D6 | D7 | D8 | D9 | D10 | D11 | D12 | D13 |
|----|----|----|----|----|----|----|----|----|-----|-----|-----|-----|
| +a | +b | +c | -d | -a | -b | +c | +d | +a | -b | -c | -d |
| +c | +d | +a | -b | -c | -d | +a | +b | +c | -d | -a | -b |
| +a | +b | -c | -d | -a | +b | +c | +d | -a | -b | -c | +d |
| +c | +d | -a | -b | -c | +d | +a | +b | -c | -d | -a | +b |
| -a | -b | -c | +d | +a | +b | -c | -d | -a | +b | +c | +d |
| -c | -d | -a | +b | +c | +d | -a | -b | -c | +d | +a | +b |
| -a | -b | +c | +d | +a | -b | -c | -d | +a | +b | +c | -d |
| -c | -d | +a | +b | +c | -d | -a | -b | +c | +d | +a | -b |

FIG. 26

| | D1 | D2 | D3 | D4 | D5 | D6 | D7 | D8 | D9 | D10 | D11 | D12 | D13 |
|---|---|---|---|---|---|---|---|---|---|---|---|---|---|
| | +a | +b | +c | -d | -a | -b | +c | +d | +a | -b | -c | -d | |
| | +c | +d | +a | -b | -c | -d | +a | +b | +c | -d | -a | -b | |
| | +a | +b | -c | -d | -a | +b | +c | +d | -a | -b | -c | +d | |
| | +c | +d | -a | -b | -c | +d | +a | +b | -c | -d | -a | +b | |

LIQUID CRYSTAL DISPLAY AND METHOD FOR DRIVING THE SAME

CROSS-REFERENCE TO RELATED APPLICATION

This application claims priority to and the benefit of Korean Patent Application No. 10-2013-0155780, filed on Dec. 13, 2013, which is hereby incorporated by reference for all purposes as if fully set forth herein.

BACKGROUND

Field

Exemplary embodiments of the present invention relate to a liquid crystal display, and a method for driving the same.

Discussion of the Background

A liquid crystal display (LCD) is one of the flat panel displays which have recently been widely used. An LCD generates an electric field by applying different potentials to a pixel electrode and a common electrode of a liquid crystal display panel so as to change an orientation of liquid crystal molecules and control light transmittance based on the changed orientation of the liquid crystal molecules, thereby displaying an image.

When an electric field is continuously applied to a liquid crystal material in the same direction, the liquid crystal material deteriorates. To prevent this problem, a voltage is applied to a pixel electrode and driven to invert its polarity with respect to a voltage applied to a common electrode. However, when the inversion driving is performed in the liquid crystal display having a pixel which is formed of an even number of subpixels, a polarity biasing phenomenon of a data voltage may occur.

The above information disclosed in this Background section is only for enhancement of understanding of the background of the invention and, therefore, it may contain information that does not constitute prior art.

SUMMARY

Exemplary embodiments of the present invention provide a liquid crystal display having excellent display quality, and a method for driving the same.

Exemplary embodiments of the present invention also provide a polarity disposition preventing polarity biasing of a data voltage from occurring in a liquid crystal display having a pixel which is formed of an even number of subpixels.

Additional features of the invention will be set forth in the description which follows and, in part, will be apparent from the description, or may be learned by practice of the invention.

An exemplary embodiment of the present invention discloses a liquid crystal display, including: gate lines arranged in a row direction; data lines arranged in a column direction; and subpixels arranged in basic units of eight subpixels. Each subpixel is connected to one of the gate lines and one of the data lines, and the subpixels are continuously arranged along a row. In the basic units, polarities between adjacent subpixels from a first subpixel to a fourth subpixel along the row may be opposite to each other, polarities between adjacent subpixels from a fifth subpixel to an eighth subpixel along the row may be opposite to each other, and polarities of the fourth subpixel and the fifth subpixel may be the same as each other.

An exemplary embodiment of the present invention also discloses a liquid crystal display, including: gate lines arranged in a row direction; data lines arranged in a column direction; and subpixels arranged in basic units of four subpixels. Each subpixel is connected to one of the gate lines and one of the data lines, and the subpixels are continuously arranged along a row. In the basic units, each two subpixels along the row may have opposite polarities. The subpixels which are present in one of the two columns adjacent to each other may have the same polarity along the column, and the subpixels which are present in the other column may have an opposite polarity between the adjacent subpixels along the column.

An exemplary embodiment of the present invention also discloses a liquid crystal display, including: gate lines arranged in a row direction; data lines arranged in a column direction; and subpixels arranged in basic units of eight subpixels. Each subpixel is connected to one of the gate lines and one of the data lines, and the subpixels are continuously arranged along a row. In the basic unit, in the row direction, the first to fourth subpixels may have an opposed polarity between adjacent subpixels, the fifth to eighth subpixels may have an opposed polarity between the adjacent subpixels, and the fourth subpixel and the fifth subpixel may have the same polarity. In the column direction, subpixels of first to third columns and fifth to seventh columns may have an opposed polarity between the adjacent subpixels in each repetitive unit of three subpixels, and subpixels of the fourth column and the eighth column may have an opposite polarity for each three subpixels.

An exemplary embodiment of the present invention also discloses a liquid crystal display, including: gate lines arranged in a row direction; data lines arranged in a column direction; and subpixels arranged in basic units of eight subpixels. Each subpixel is connected to one of the gate lines and one of the data lines, and the subpixels are continuously arranged along a row. In the basic unit, in the row direction, first to fourth subpixels may have the same polarity, and fifth to eighth subpixels may have polarities opposite to those of the first to fourth subpixels. In the column direction, subpixels of first to third columns and fifth to seventh columns may have an opposed polarity for each repetitive unit of three subpixels, and subpixels of a fourth column and an eighth column may have an opposed polarity between the adjacent subpixels in each repetitive unit.

An exemplary embodiment of the present invention also discloses a liquid crystal display, including: gate lines arranged in a row direction; data lines arranged in a column direction; and subpixels arranged in basic units of four subpixels. Each subpixel is connected to one of the gate lines and one of the data lines, and the subpixels are continuously arranged along a row. In the basic units, each two subpixels along the row may have opposite polarities. In the column direction, the subpixels which are present in one of the two columns adjacent to each other may have the same polarity, and the subpixels which are present in the other column may have an opposite polarity for each two subpixels.

An exemplary embodiment of the present invention also discloses a liquid crystal display, including: gate lines arranged in a row direction; data lines arranged in a column direction; and subpixels arranged in basic units of six subpixels. Each of the subpixels is connected to one of the gate lines and one of the data lines, and the subpixels are continuously arranged along a row. A polarity may be opposed for each three subpixels in each basic unit along the row.

An exemplary embodiment of the present invention also discloses a method for driving a liquid crystal display including subpixels arranged in a matrix which are respectively connected to gate lines arranged in a row direction and data lines arranged in a column direction. A data driver may apply a data voltage having an opposite polarity between adjacent subpixels in the row direction to data lines connected to first to fourth subpixels in the row direction; apply data voltages having an opposite polarity between adjacent subpixels in the row direction to data lines connected to fifth to eighth subpixel in the row direction; and apply data voltages having the same polarity to the data lines connected to the fourth and fifth subpixels in the row direction.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3 to FIG. 8 are diagrams illustrating a polarity disposition and an inversion driving of the liquid crystal display according to a first exemplary embodiment of the present invention.

FIG. 12 to FIG. 17 are diagrams illustrating a polarity disposition and an inversion driving of the liquid crystal display according to a second exemplary embodiment of the present invention.

FIG. 21 to FIG. 26 are diagrams illustrating polarity dispositions of liquid crystal displays according to other exemplary embodiments of the present invention.

DETAILED DESCRIPTION OF THE ILLUSTRATED EMBODIMENTS

Figure 1:
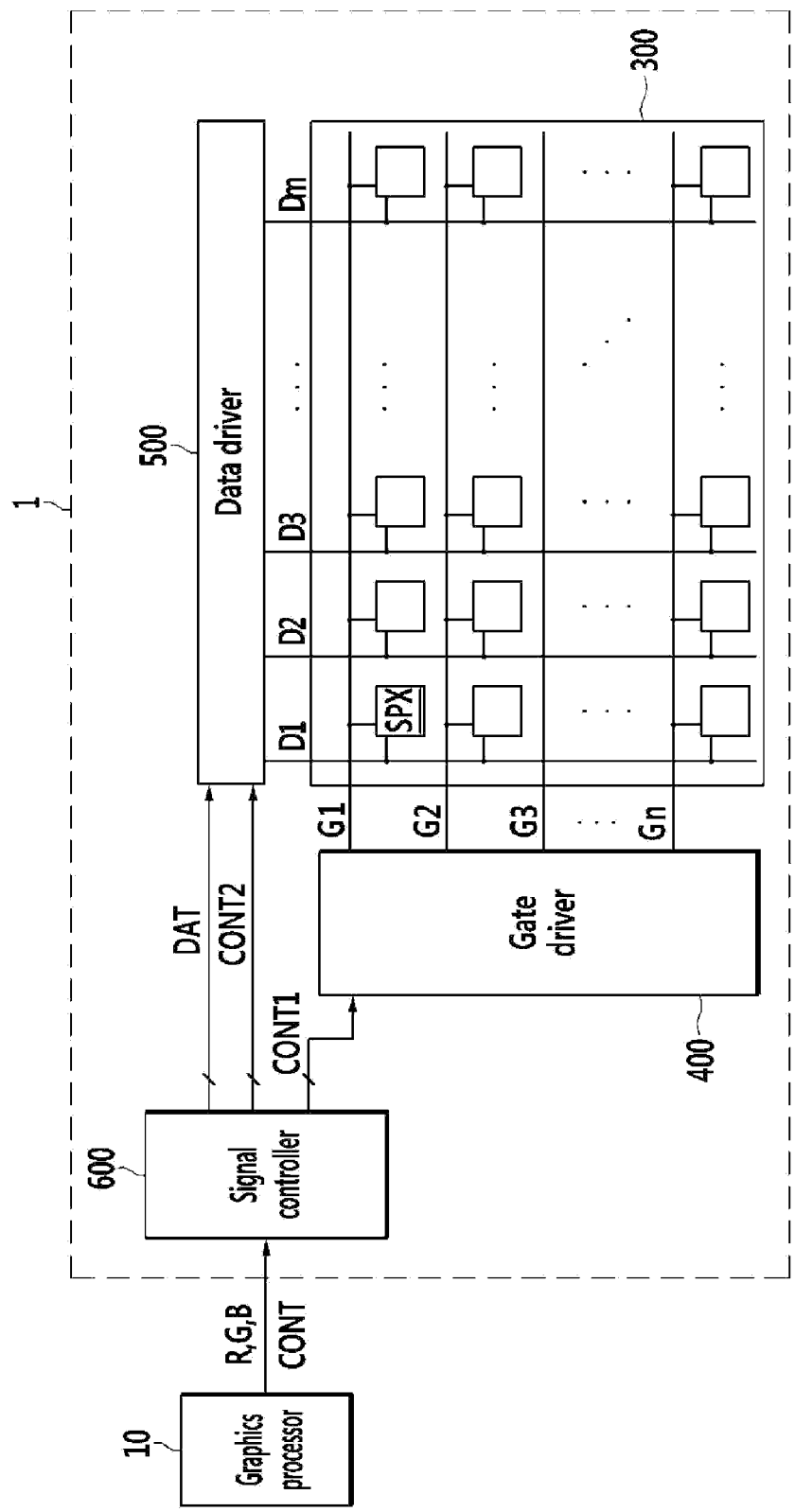
FIG. 1 is a block diagram of a liquid display device according to an exemplary embodiment of the present invention.

The present invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display and a method for driving the same according to an exemplary embodiment of the present invention will be described in detail with reference to FIGS. 1 to 2.

Figure 2:
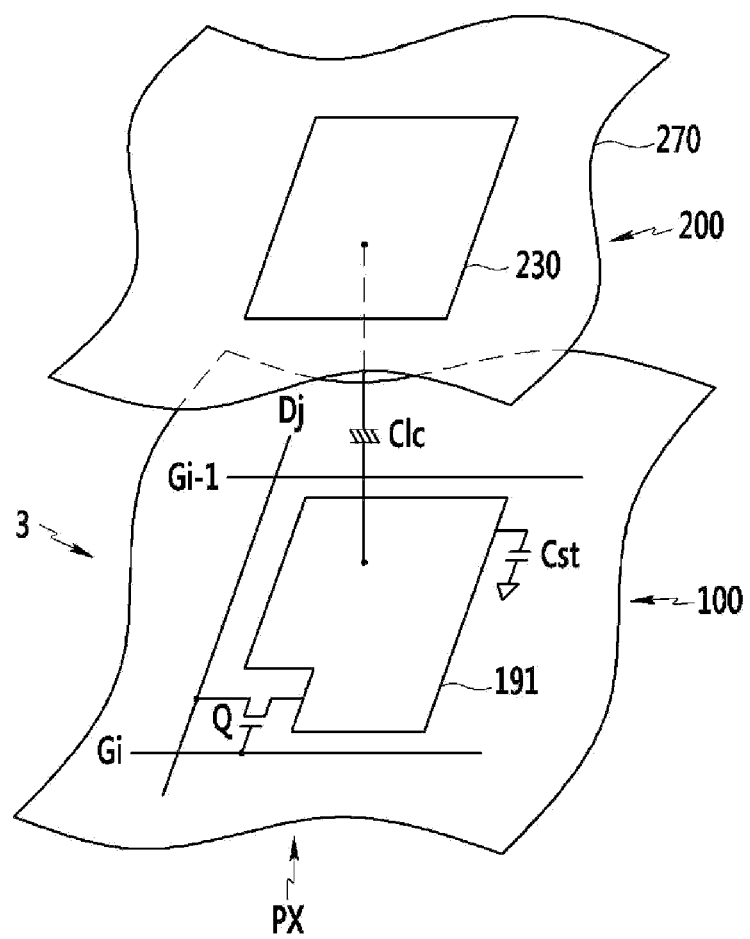
FIG. 2 is an equivalent circuit diagram of one subpixel in the liquid display device according to an exemplary embodiment of the present invention.

FIG. 1 is a block diagram of a liquid display device according to an exemplary embodiment of the present invention, and FIG. 2 is an equivalent circuit diagram of one subpixel in the liquid display device.

As illustrated in FIG. 1, a liquid crystal display 1 includes a liquid crystal display panel 300 which displays an image, a gate driver 400, a data driver 500, and a signal controller 600. FIG. 1 also illustrates a graphics processor 10, which is located outside the liquid crystal display 1.

The graphics processor 10 provides image signals R, G, and B, and a control signal CONT to the signal controller 600 of the liquid crystal display 1. The control signal CONT includes a horizontal synchronization signal, a vertical synchronization signal, a clock signal, and a data enable signal, and the like. The image signals R, G, and B, and the control signal CONT may be transmitted to the signal controller 600 in, for example, a low voltage differential signaling (LVDS) scheme.

The liquid crystal display panel 300 includes lower and upper panels 100 and 200 which face each other, and a liquid crystal layer 3 disposed therebetween. The liquid crystal display panel 300 includes gate lines G1 to Gn and data lines D1 to Dm. The gate lines G1 to Gn extend approximately in a horizontal (row) direction, and the data lines D1 to Dm extend approximately in a vertical (column) direction, while being insulated from, and intersecting with, the gate lines G1 to Gn.

A single gate line and a single data line are connected to a single subpixel SPX. The subpixels SPX are arranged in a matrix, in which each subpixel SPX may include a thin film transistor Q, a liquid crystal capacitor Clc, and a sustain capacitor Cst.

A pixel PX, which is a minimum unit of an image, is formed of subpixels SPX, to which luminance may be independently assigned, such that the subpixels SPX are combined to be able to display colors and luminance. For example, one pixel PX may be formed of three subpixels SPX representing red, green, and blue, which are three primary colors of light. The single pixel PX may also be formed of even-numbered subpixels SPX. For example, the pixel PX may be formed of four subpixels SPX, each of which represents red, green, blue, and white. As another example, the single pixel PX may be formed of two subpixels SPX, each of which represents red and green, or blue and green, and such a scheme of forming the pixel PX is a so-called pentile scheme.

Referring to FIG. 2, a control terminal of the thin film transistor Q may be connected to one gate line Gi, an input terminal of the thin film transistor Q may be connected to one data line Dj, and an output terminal of the thin film transistor Q may be connected to a pixel electrode 191, which is one terminal of the liquid crystal capacitor Clc, and one terminal of the sustain capacitor Cst. The other terminal of the liquid crystal capacitor Clc may be connected to a common electrode 270, and a sustain voltage may be applied to the other terminal of the sustain capacitor Cst. Depending on the type of liquid crystal display panel 300, both the pixel electrode 191 and the common electrode 270 may be formed on the lower panel 100.

The signal controller 600 receives input image signals R, G, and B and the control signal CONT, that is, the horizontal synchronizing signal, the vertical synchronization signal, the clock signal, the data enable signal, and the like, from the external graphic processor 10. The signal controller 600 processes the image signals R, G, and B to be suitable for operating conditions of the liquid crystal display panel 300 based on the image signals R, G, and B and the control signal CONT, and then generates and outputs an image data DAT, a gate control signal CONT1, a data control signal CONT2, and the clock signal.

The gate control signal CONT1 includes a start pulse vertical signal, which instructs a start pulse, and a clock pulse vertical signal, which is a reference of generating a gate-on voltage. An output period of the start pulse vertical signal coincides with one frame or a refresh rate. The gate control signal CONT1 may further include an output enable signal, which limits a sustain time of the gate-on voltage.

The data control signal CONT2 includes a start pulse horizontal signal, which instructs a transmission start of the image data DAT for the subpixel SPX of one row, a load signal, which instructs application of the corresponding data voltage to data lines D1 to Dm, and the like. The data control signal CONT2 may further include an inversion signal, which inverts a polarity of the data voltage with respect to a common voltage Vcom The gate lines G1 to Gn of the liquid crystal display panel 300 are connected to the gate driver 400, and the gate-on voltage is sequentially applied to the gate lines G1 to Gn, depending on the gate control signal CONT1 applied from the signal controller 600, and a gate-off voltage is applied to the gate lines G1 to Gn in a period in which the gate-on voltage is not applied.

The data lines D1 to Dm of the liquid crystal display panel 300 are connected to the data driver 500, and the data driver 500 receives the data control signal CONT2 and the image data DAT from the signal controller 600.

The data driver 500 converts the image data DAT into the data voltage using a gray voltage generated from a gray voltage generator (not illustrated), and transmits the data voltage to the data lines D1 to Dm. The data voltage includes the data voltage having both a positive polarity and a negative polarity based on the common voltage (hereinafter, simply referred to as "positive data voltage" or "negative data voltage"). The positive data voltage and the negative data voltage are alternately applied based on a frame, a row, and/or a column, and thus, are driven in an inverted manner. Therefore, the inversion driving may be classified into types, such as a frame inversion, a column inversion, a row inversion (or line inversion), or a dot inversion, and the inversion may also be implemented in even a more complex manner.

FIGS. 3 to 8 are diagrams illustrating polarity disposition and inversion driving of the liquid crystal display according to a first exemplary embodiment of the present invention.

In the drawings, long vertical lines represent data lines that are arranged substantially in parallel with each other, and a rectangle represents a subpixel SPX. Short horizontal lines represent connections between the data line and the subpixel SPX. A positive (+) or a negative (−) within the rectangle represents the polarity (hereinafter, referred to as "polarity of subpixel SPX") of the data voltage which is applied to each of the subpixels SPX at a specific time. The letters "a", "b", "c", and "d" represent colors that are represented by each of the subpixels SPX. The same rule applies to the following drawings.

Figure 3:
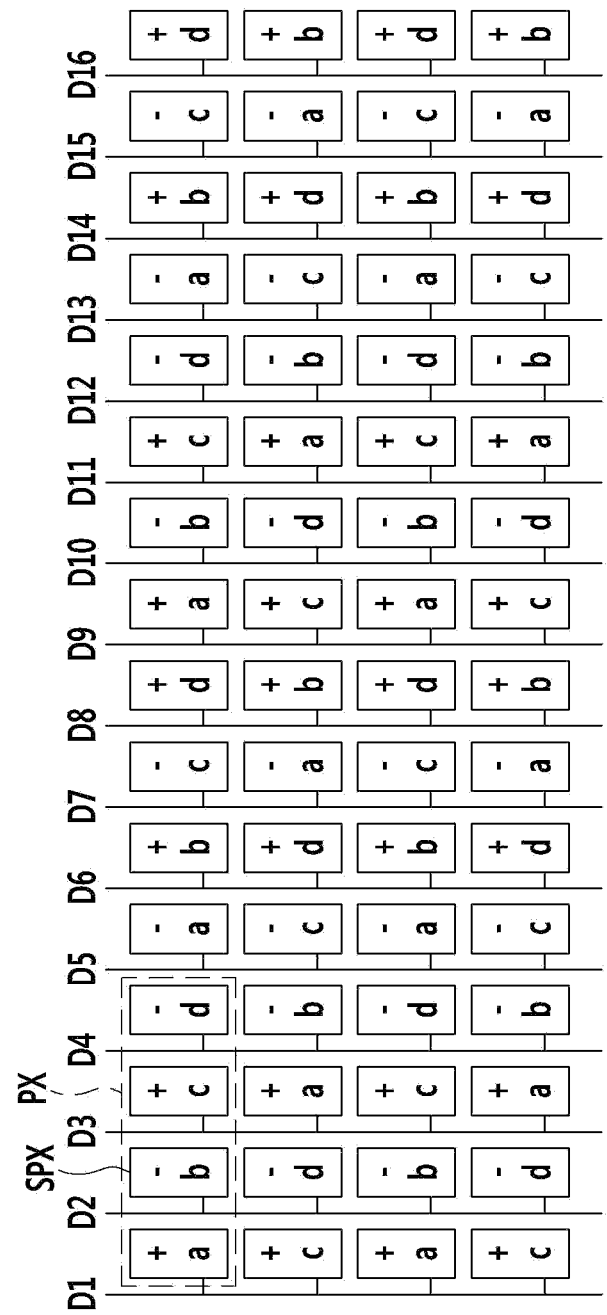
Figure 4:
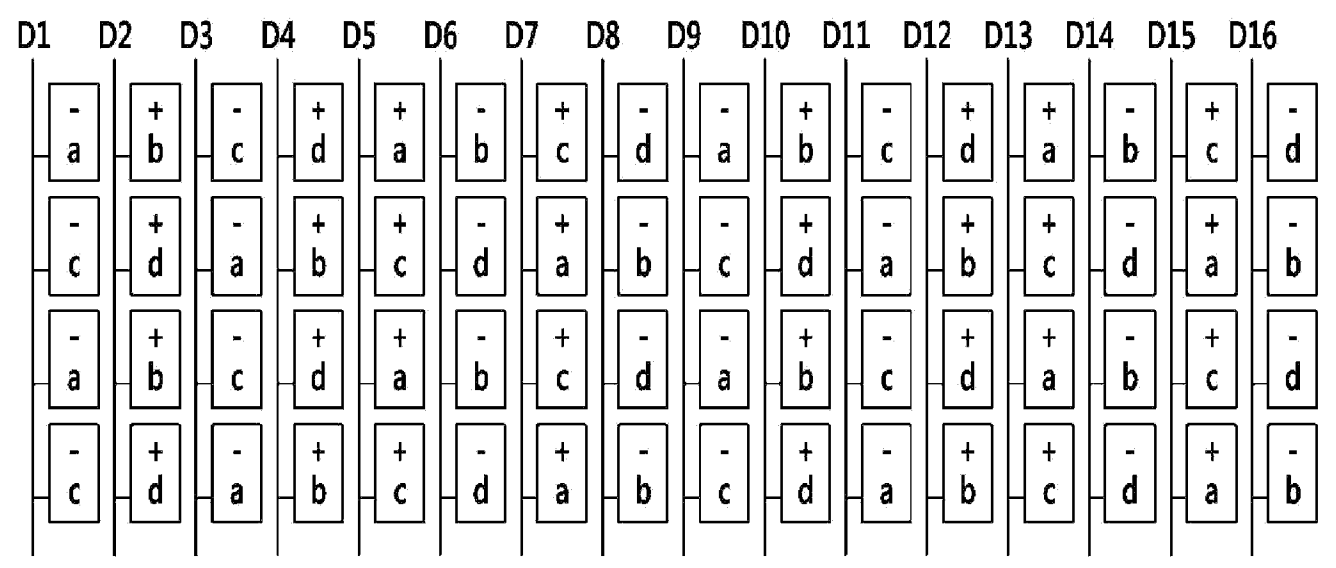

Referring to FIGS. 3 and 4, FIG. 3 illustrates the polarity disposition in an n-th frame in the liquid crystal display, and FIG. 4 illustrates the polarity disposition in an n+1-th frame. All colors of "a", "b", "c", and "d", which are colors represented by each of the subpixels SPX, may be different; a pair of colors among these colors may be the same (for example, the colors "a" and "c" may be the same); or two pairs of colors may also be the same (For example, the colors of "a" and "c" may be the same, and the colors of "b" and "d" may be the same). Meanwhile, four subpixels SPX of the colors of "a", "b", "c", and "d" may form one pixel PX, and two subpixels SPX of the colors of "a" and "b" or two subpixels SPX of the colors of "c" and "d" may form one pixel PX. Hereinafter, an exemplary embodiment of the present invention will be described in detail based on, by way of example, the case in which all the colors of "a", "b", "c", and "d" are different, and four subpixels SPX form one pixel PX.

The data lines are all connected to the subpixels SPX, which are located to the right of the data lines in FIGS. 3 and 4.

According to an exemplary embodiment, the data lines D1, D2, . . . Dm may all be connected to the subpixels SPX that are located to the right thereof, but any data line may instead be connected to the subpixels SPX that are located to the left thereof.

In the n-th frame, a positive (+) data voltage is applied to first, third, sixth, and eighth data lines D1, D3, D6, and D8, and a negative (−) data voltage is applied to second, fourth, fifth, and seventh data lines D2, D4, D5, and D7. In the n+1-th frame, the negative (−) data voltage is applied to first, third, sixth, and eighth data lines D1, D3, D6, and D8, and the positive (+) data voltage is applied to second, fourth, fifth, and seventh data lines D2, D4, D5, and D7.

As described above, the application of the data voltage having different polarities depending on the data line is repeated based on eight data lines. That is, the data voltage of positive (+), negative (−), positive (+), negative (−), negative (−), positive (+), negative (−), and positive (+) is repeatedly applied from the left data line to each data line. Therefore, the polarity of the data voltage applied to the first to eighth data lines D1 to D8 may also be similarly applied to ninth to sixteenth data lines D9 to D16. For inversion driving in the first exemplary embodiment, the data driver 500 applies the data voltage having a polarity inverted for each frame to each data line so as to meet the foregoing polarity.

The subpixels SPX that are located in the first to fourth columns have inverted polarity between the adjacent subpixels, and the subpixels SPX that are located in the fifth to eighth columns have inverted polarity between the adjacent subpixels SPX, but polarities of the subpixels SPX that are located in the fifth to eighth columns are opposite to those of the subpixels SPX that are located in the first to fourth columns, respectively. The array of first to eighth subpixels SPX configure a basic unit in which polarities are repeated in a row direction. That is, the polarities of the array of ninth to sixteenth subpixels SPX are sequentially the same as those of the array of first to eighth subpixel SPX.

When the data voltage is applied to the subpixels of all the colors, in the n-th frame, the number of positive (+) subpixels is the same as the number of negative (−) subpixels for each color. Further, the positive (+) subpixel and the negative (−) subpixel are alternately disposed in the row direction for each color. For example, in the case of the subpixel of color "a" in the two basic units, the subpixel of color "a" is located at each four subpixels one-by-one, and the polarity thereof is positive (+), negative (−), positive (+), and negative (−) from the left. Therefore, because the positive polarity and the negative polarity are evenly mixed, the deterioration in display quality resulting from the difference in luminance, which may be present between the polarities, does not occur.

Similarly to the n-th frame, in the n+1-th frame, the number of positive (+) subpixels is the same as the number of negative (−) subpixels for each color, and the positive (+) subpixel and the negative (−) subpixel are alternately disposed in the row direction for each color. Therefore, because the difference in luminance (for example, even though the data voltage having the same level is applied, the luminance may be different depending on the polarity) between the frames due to polarity mismatching is not present, flicker does not occur.

Meanwhile, the subpixels which are present in each subpixel array are respectively connected to the same data line. As a result, when subpixels of one subpixel array are connected to different data lines, a difference in luminance resulting from a characteristic deviation such as a capacitance Cgs between a gate and a source of the thin film transistor, which may occur between subpixels connected to different data lines, does not occur.

Figure 5:
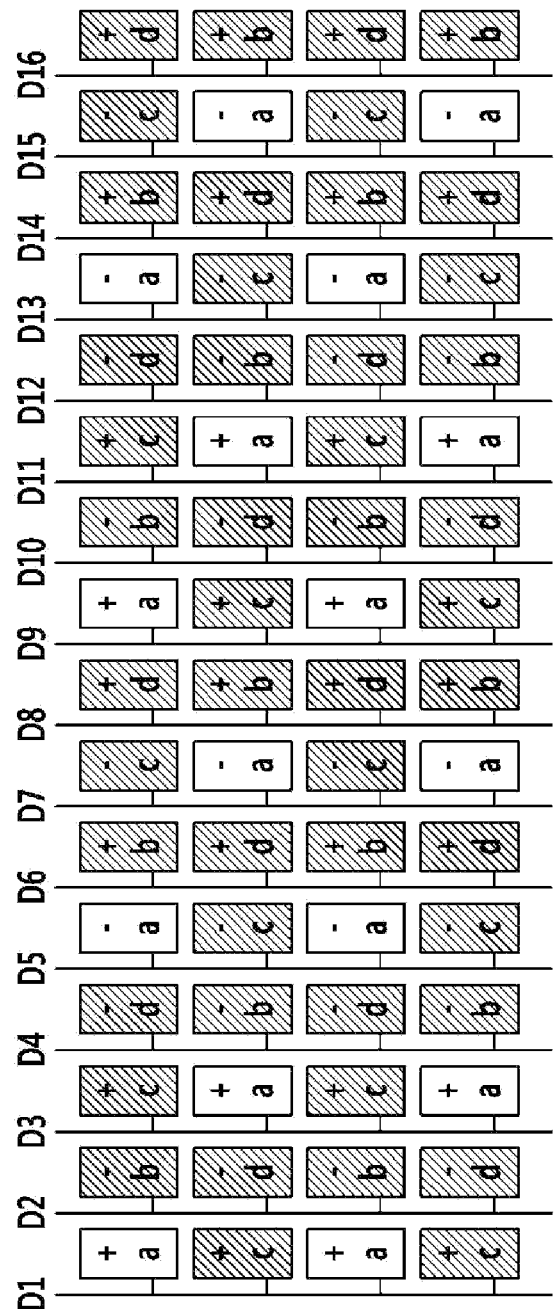
Figure 6:
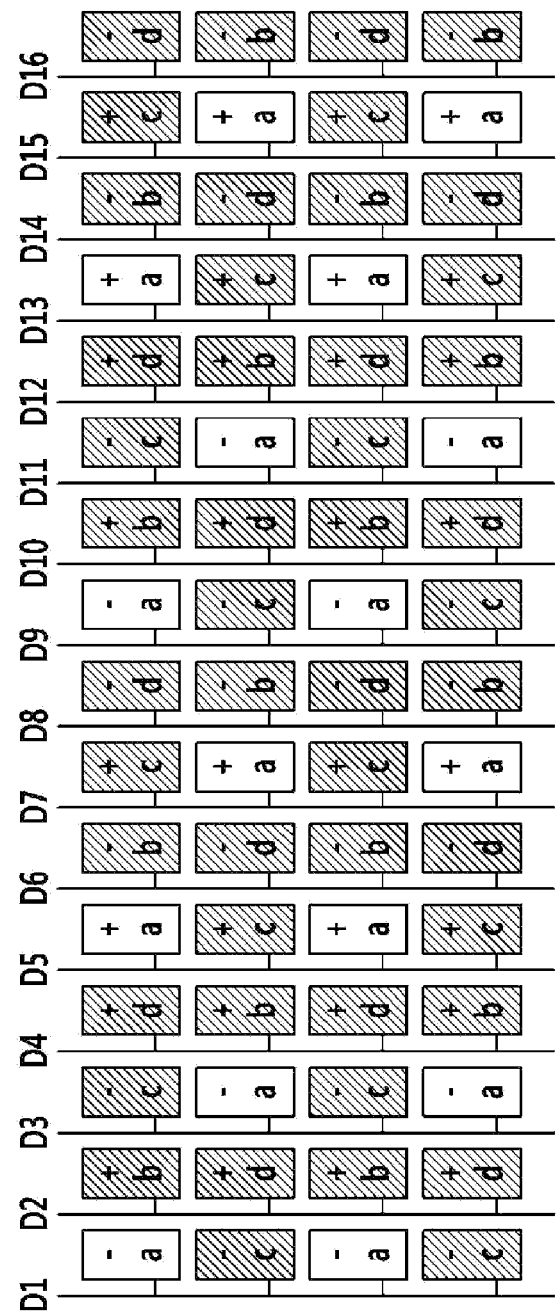

FIGS. 5 and 6 illustrate the polarity dispositions of the n-th frame and the n+1-th frame at the time of displaying only one color. For example, the case in which the "a" is red corresponds to the case of displaying a red screen. The subpixel shaded in the drawings illustrates the case in which the data voltage of the lowest gray is applied to the corresponding subpixel, which may also be similarly applied to the following drawings. Even though the polarity of the subpixel representing the red "a" is inverted in the n-th frame and the n+1-th frame, the same number of positive (+) subpixels and negative (−) subpixels are alternately disposed in each frame. Therefore, even in the case of displaying a monochrome image, a difference in luminance does not occur between the frames.

Figure 7:
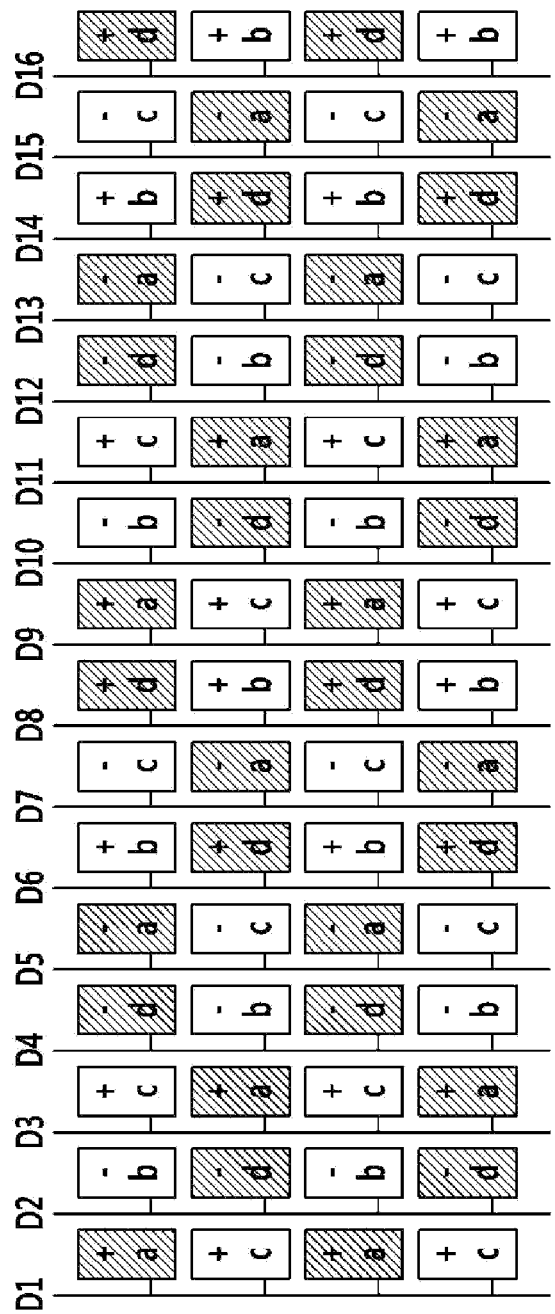
Figure 8:
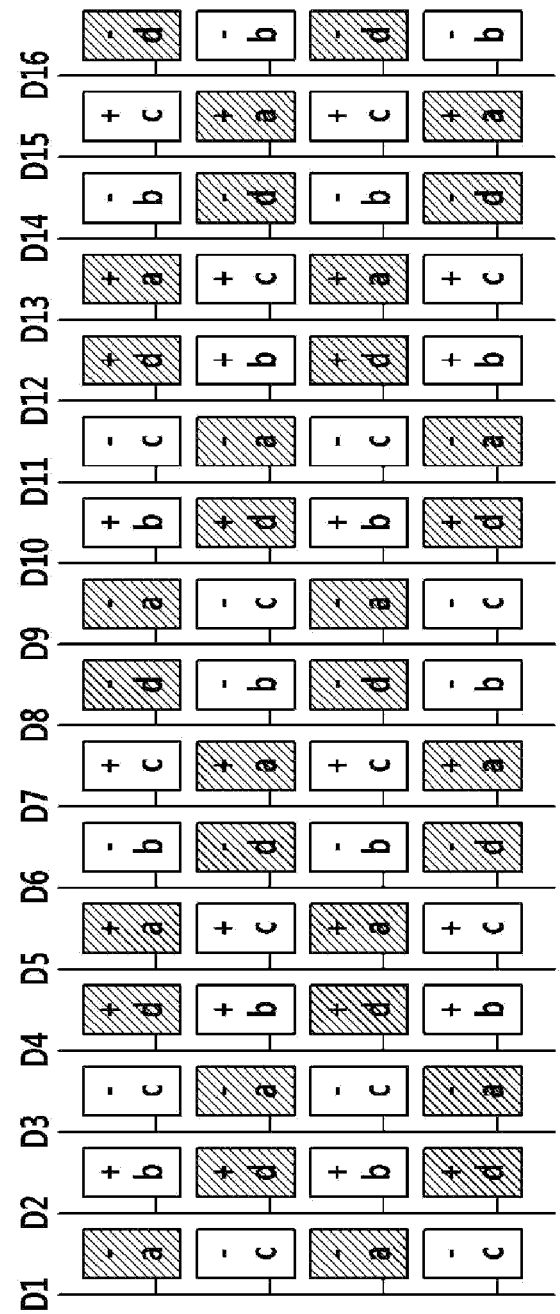

FIGS. 7 and 8 each illustrate the polarity dispositions of the n-th frame and the n+1-th frame at the time of displaying mixed color. For example, the "a", "b", "c", and "d" are respectively red, green, blue, and white, and the display panel displays cyan. Even though the polarities of the subpixels each representing the green "b" and the blue "c" are inverted in the n-th frame and the n+1-th frame, the number of positive (+) subpixels and negative (−) subpixels are alternately disposed in each frame. Therefore, even in the case of displaying mixed color, a difference in luminance does not occur between the frames.

Figure 9:
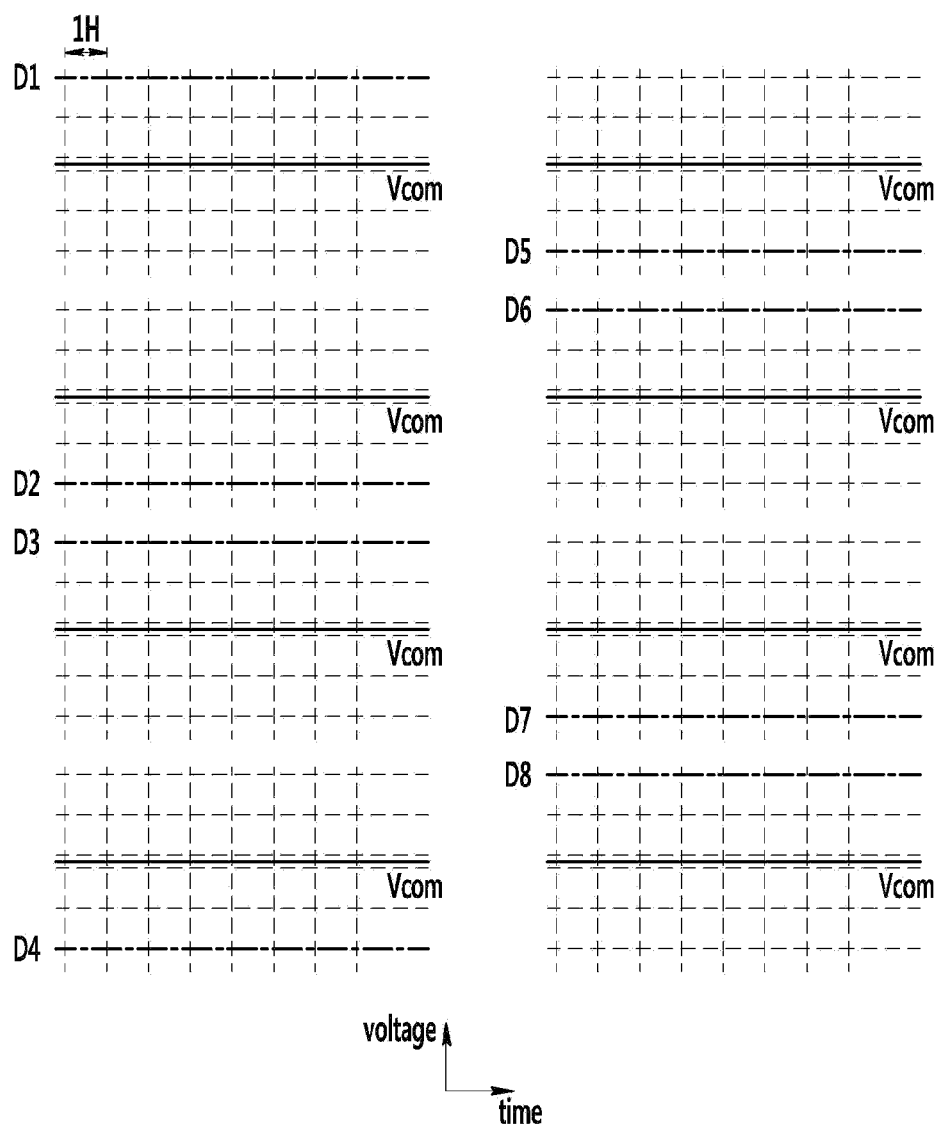
FIG. 9 to FIG. 11 are diagrams illustrating an example of a data voltage applied to a data line in the liquid crystal display according to the first exemplary embodiment of the present invention.
Figure 10:
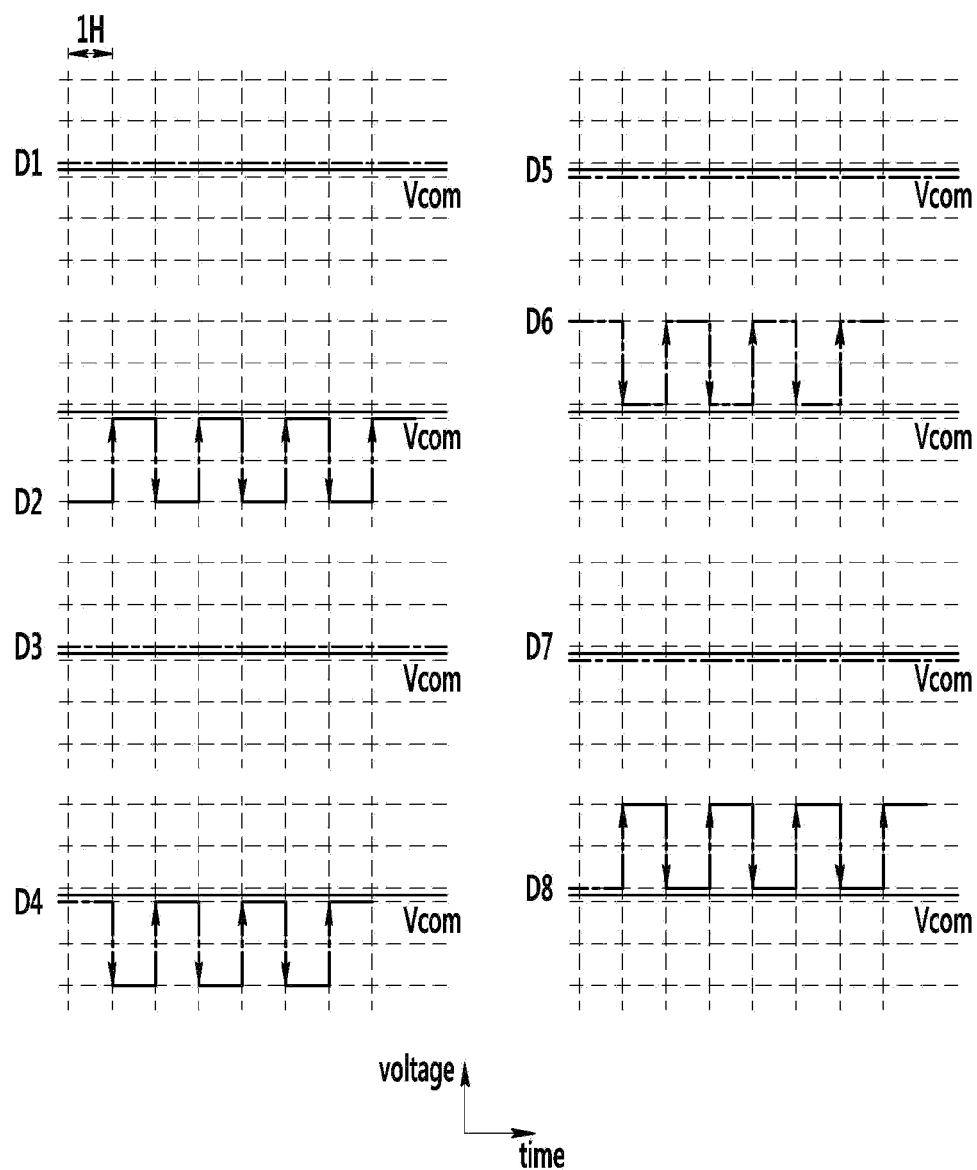
Figure 11:
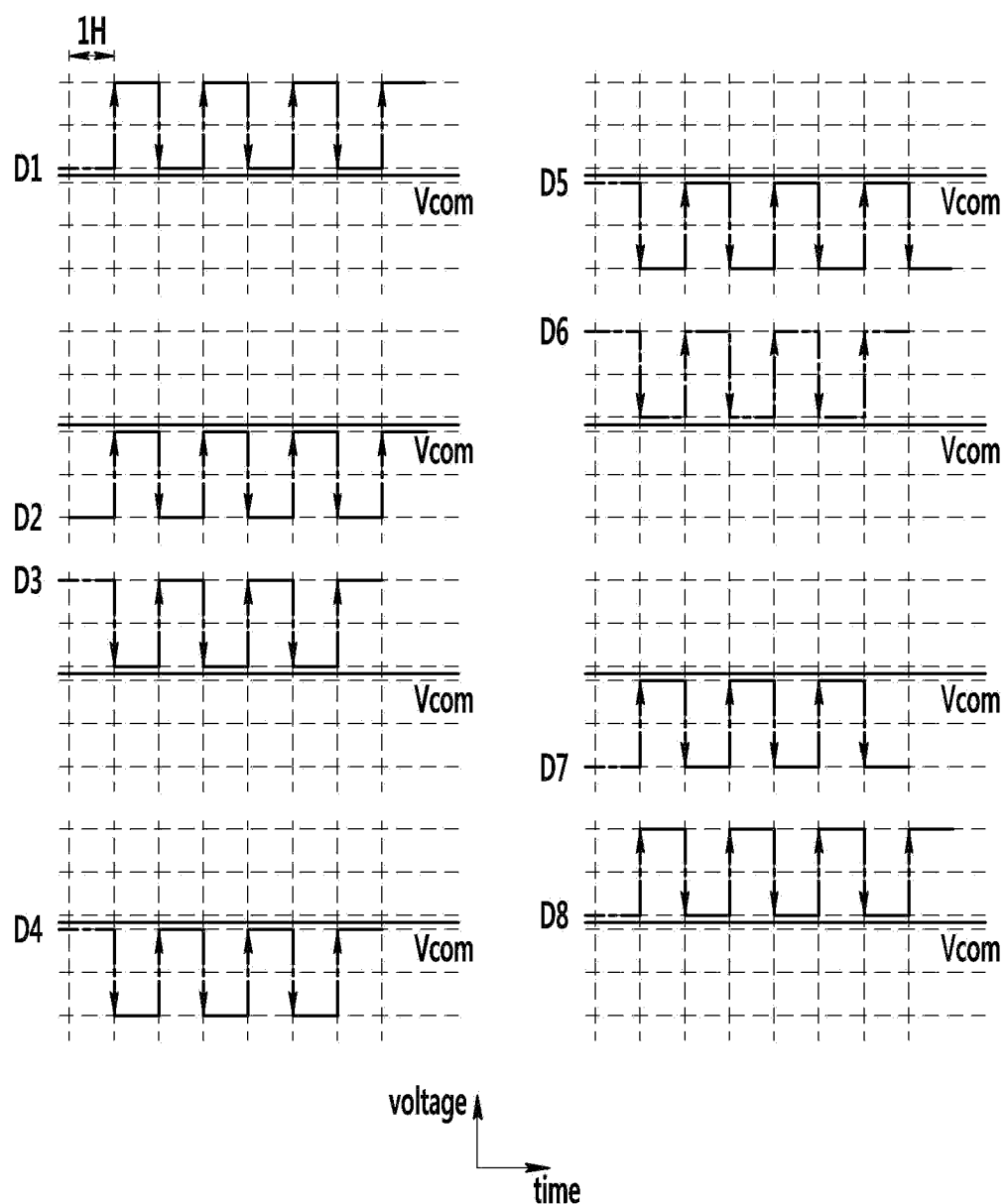

FIGS. 9 to 11 are diagrams illustrating an example of a data voltage applied to a data line in the liquid crystal display according to a first exemplary embodiment of the present invention.

FIG. 9 illustrates the data voltage applied to the data line when the same data voltage, for example, the maximum gray voltage, is applied to all the subpixels. In FIG. 9, one unit in the horizontal direction indicates one horizontal period "1H". The voltage applied to the first data line D1 and the voltage applied to the second data line D2 have the same magnitude but opposite polarities. The pair of third and fourth data lines D3 and D4, the pair of fifth and sixth data lines D5 and D6, and the pair of seventh and eighth data lines D7 and D8 also have the same relationship. Therefore, because the data voltage is applied to the data line in a complementary manner (i.e., having the same magnitude but an opposed polarity), the polarities of the data voltage are balanced. As the result, the polarity of the data voltage is not biased to any one side and therefore, the data voltage does not affect the common voltage Vcom.

FIG. 10 illustrates the data voltage applied to the data line when the monochrome is displayed by applying the maximum gray voltage only to the subpixel of the color "b" (e.g., green) and the minimum gray voltage to the subpixels of the remaining colors. As illustrated, the data voltages applied to the first and third data lines D1 and D3 and the data voltages applied to the fifth and seventh data lines D5 and D7 have the same magnitude and an opposed polarity. The voltage applied to the second data line D2 and the voltage applied to the sixth data line D6 have the same magnitude but opposite polarities, and when any one of the voltages rises, the other thereof falls. Similarly, the voltage applied to the fourth data line D4 and the voltage applied to the eighth data line D8 are the same magnitude and an opposed polarity and when nay one of the voltages rises, the other of thereof falls. Therefore, because the voltage is complementarily applied to the data line and is also applied to prevent the rising and falling of the voltage, the polarity of the data voltage is not biased to any one side at the time of displaying the monochrome, and therefore the data voltage does not affect the common voltage Vcom.

FIG. 11 illustrates the data voltage applied to the data line when the mixed color (e.g., cyan) is displayed by applying the maximum gray voltage to the subpixel of the color "b" (e.g., green) and the subpixel of the color "c" (e.g., blue), and applying the minimum gray voltage to the subpixels of the remaining colors. A voltage is applied in a complementary manner to the first data line D1 and the fifth data line D5. This relationship is also shown between the second and sixth data lines D2 and D6, between the third and seventh data lines D3 and D7, and between the fourth and eighth data lines D4 and D8. Therefore, since the voltage is applied in a complementary manner to the data line and is also applied to prevent the rising and falling of the voltage, the data voltage is not biased to any one side, and therefore the data voltage does not affect the common voltage Vcom even at the time of displaying the mixed color.

FIGS. 12 to 17 are diagrams illustrating a polarity disposition and an inversion driving of the liquid crystal display according to a second exemplary embodiment of the present invention.

Figure 12:
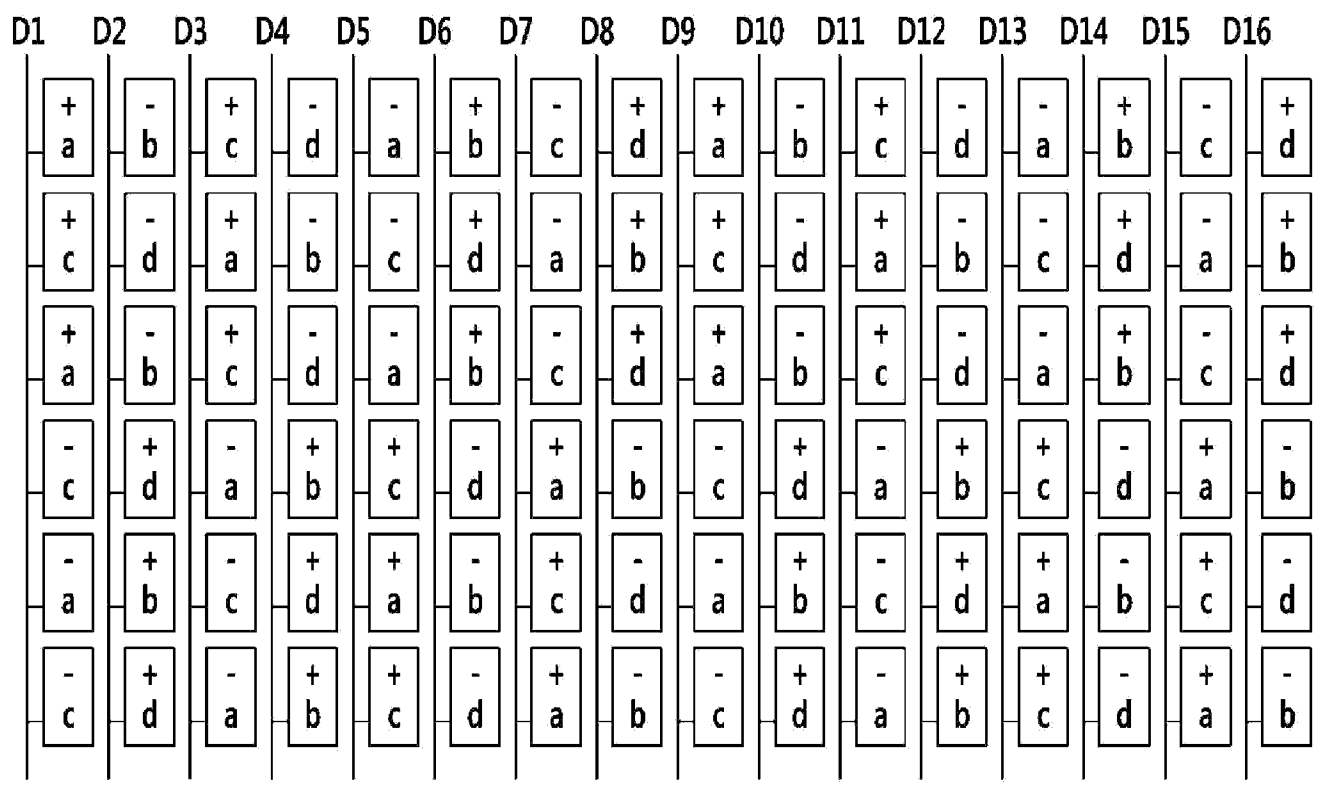
Figure 13:
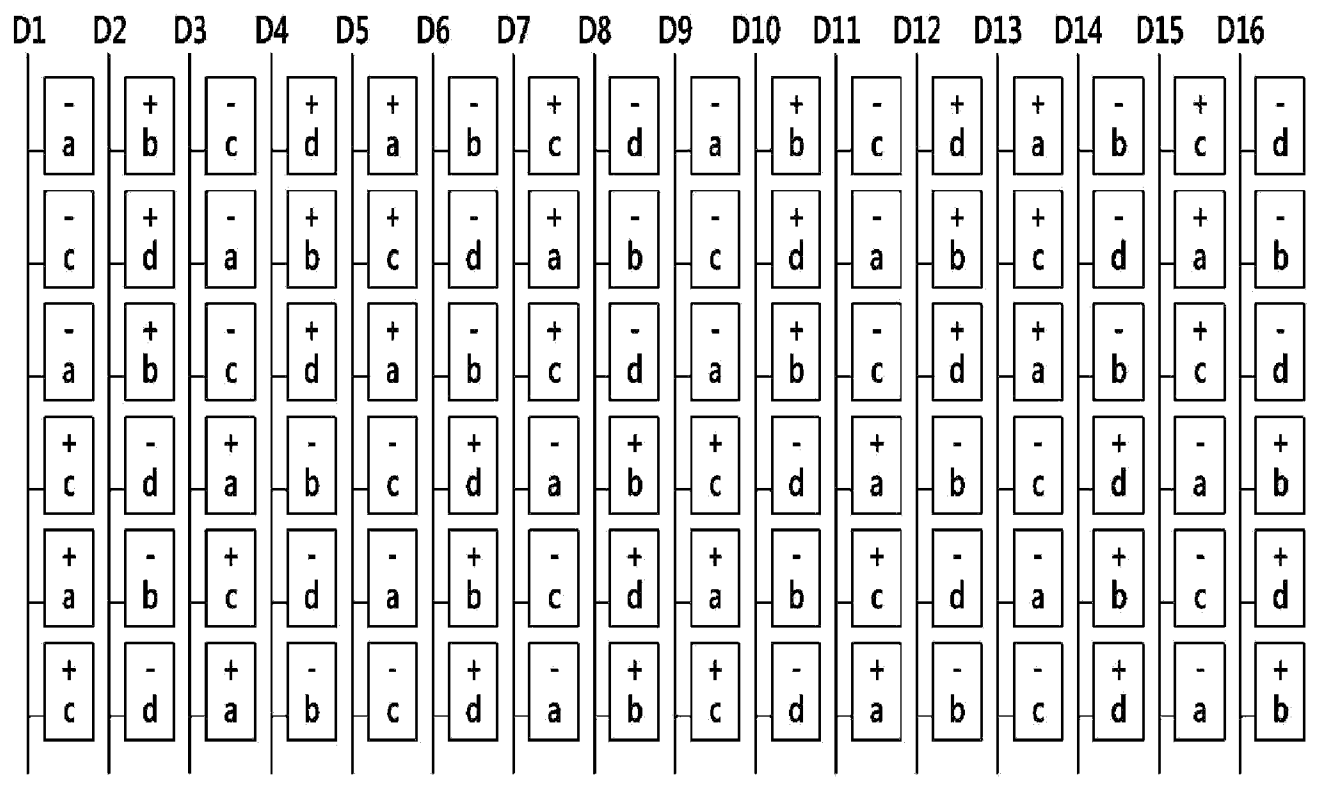

FIGS. 12 and 13 each illustrate the polarity dispositions in the n-th frame and the n+1-th frame, respectively, in the liquid crystal display.

Similarly to the foregoing first exemplary embodiment, each of the data lines is connected to the subpixels, which are located at the right thereof. Therefore, a difference in luminance due to the characteristic deviation such as the Cgs of the thin film transistor between the subpixels does not occur. Each of the data lines all may be connected to the subpixels which are located at the left thereof, as shown in FIG. 12, but the present invention is not so limited, and any data line may be connected to the subpixels which are located only at the right thereof, and any data line may be connected to the subpixels which are located only to the left thereof.

In the n-th frame shown in FIG. 12, the positive (+) data voltage and the negative (−) data voltage are repeatedly applied to the first, third, sixth, and eighth data lines D1, D3, D6, and D8 for each three subpixels in the column direction, and the negative (−) data voltage and the positive (+) data voltage are repeatedly applied to the second, fourth, fifth and seventh data lines D2, D4, D5, and D7 for each three subpixels in the column direction. That is, in contrast to the first exemplary embodiment, in the second exemplary embodiment, the data voltage having the same polarity is not applied to the corresponding data line over one frame, but the data voltage having the polarity inverted for each three subpixels in each column is applied thereto. For example, the positive (+) data voltage is applied to the subpixels which are connected to the first to third gate lines of the corresponding data line, the negative (−) data voltage is applied to the subpixels which are connected to the fourth to sixth gate lines, and the inversion driving (so-called three line inversion driving) is repeated for the corresponding data line.

In the n+1-th frame shown in FIG. 13, the data voltage is applied inversely to the n-th frame. That is, the negative (−) data voltage and the positive (+) data voltage are repeatedly applied to the first, third, sixth, and eighth data lines D1, D3, D6, and D8 for each three subpixels in the column direction. Similarly, the positive (+) data voltage and the negative (−) data voltage are repeatedly applied to the second, fourth, fifth, and seventh data lines D2, D4, D5, and D7 for each three subpixels in the column direction.

As described above, the application of the data voltage having different polarities depending on the data line, and for every group of three gate lines, is repeated based on eight data lines. Therefore, the polarity of the data voltage applied to the first to eighth data lines D1 to D8 may also be similarly applied to the ninth to sixteenth data lines D9 to D16. For the inversion driving according to the second exemplary embodiment, the data driver 500 may apply the data voltage having a polarity inverted for each frame, and the data voltage having a polarity inverted for each three gate lines in one frame to each data line so as to meet the foregoing polarity.

The subpixels located in the first to fourth columns have the inverted polarity between the adjacent subpixels, and the subpixels that are located in the fifth to eighth columns also have the inverted polarity between the adjacent subpixels, but polarities of the subpixels that are located in the fifth to eighth columns are opposite to those of the subpixels that are located in the first to fourth columns, respectively. Further, the subpixels that are located in the first to eighth columns have a polarity inverted for each three subpixels in each column. The first to eighth subpixel arrays configure a basic unit and are repeated in the row direction. That is, the polarities of the ninth to sixteenth subpixel arrays are sequentially the same as those of the first to eighth subpixel arrays.

Similarly to the first exemplary embodiment, when a data voltage is applied to the subpixels of all colors, the number of positive (+) subpixels is the same as the number of negative (−) subpixels for each color in the n-th frame and the n+1-th frame (therefore, all frames), and the positive (+) subpixels and the negative (−) subpixels are alternately disposed in the row direction for each color. Therefore, because the positive polarity and the negative polarity are evenly mixed, the deterioration in display quality resulting from a difference in luminance, which may be present between polarities, does not occur, and the difference in luminance between the frames resulting from polarity mismatching does not also occur.

Figure 14:
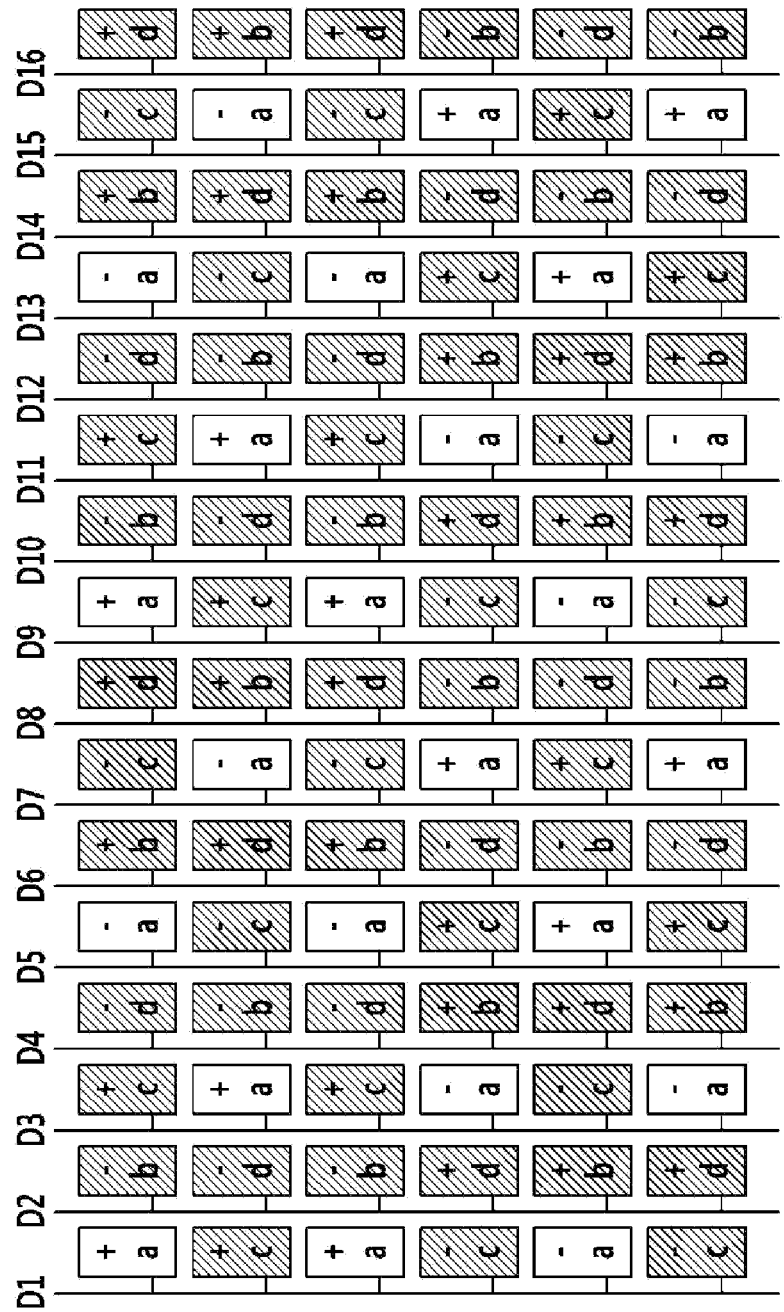
Figure 15:
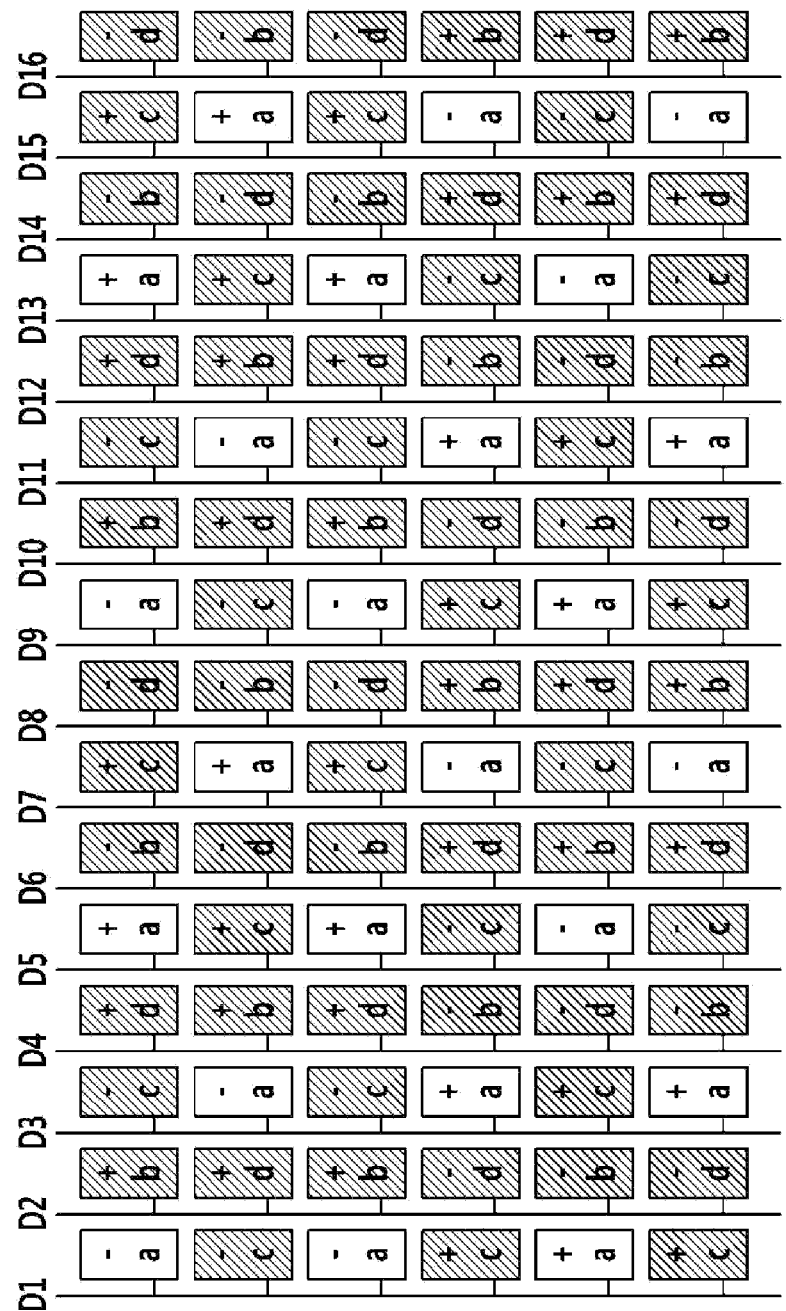

FIGS. 14 and 15 illustrate the polarity dispositions of the n-th frame and the n+1-th frame at the time of displaying only one color. For example, when "a" is red, even though the polarity of the subpixel representing the red "a" is inverted in the n-th frame and the n+1-th frame, the number of positive (+) subpixels and negative (−) subpixels are alternately disposed in each frame. Therefore, even in the case of displaying the monochrome, the difference in luminance does not occur between the frames.

Figure 16:
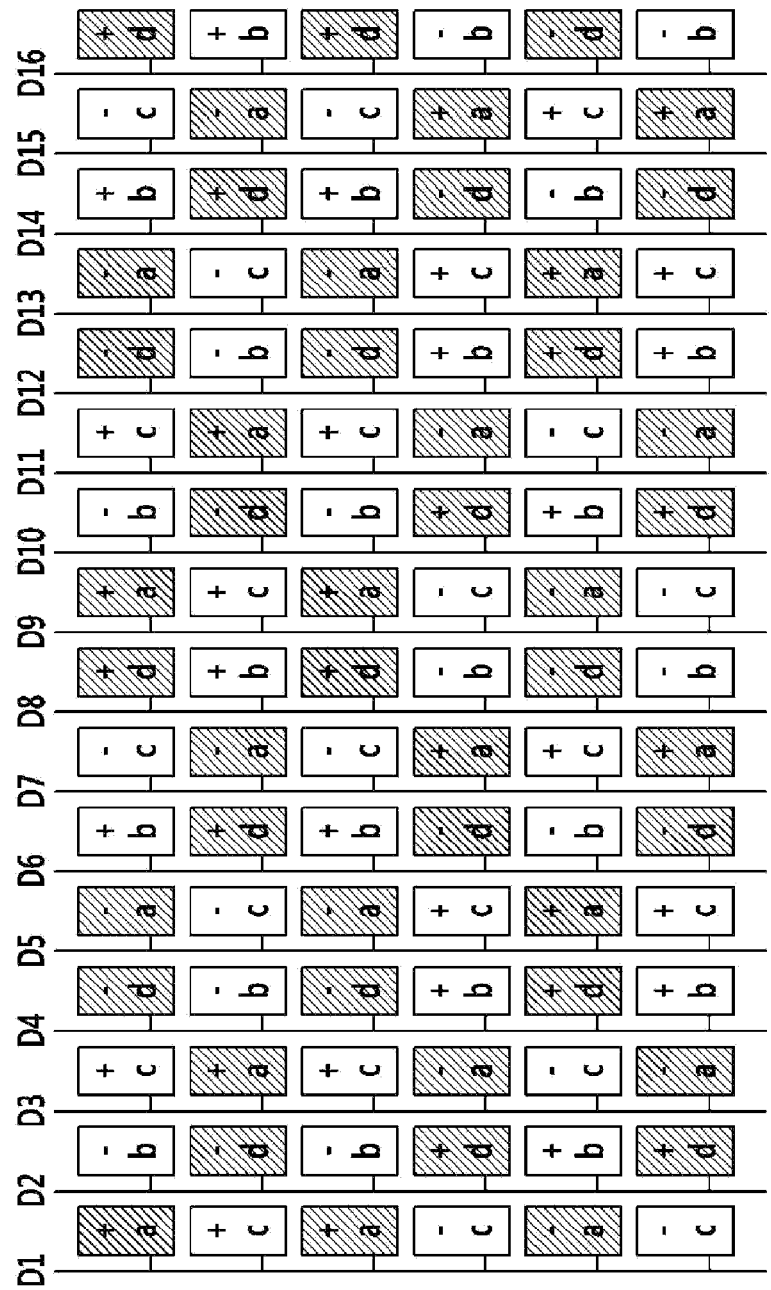
Figure 17:
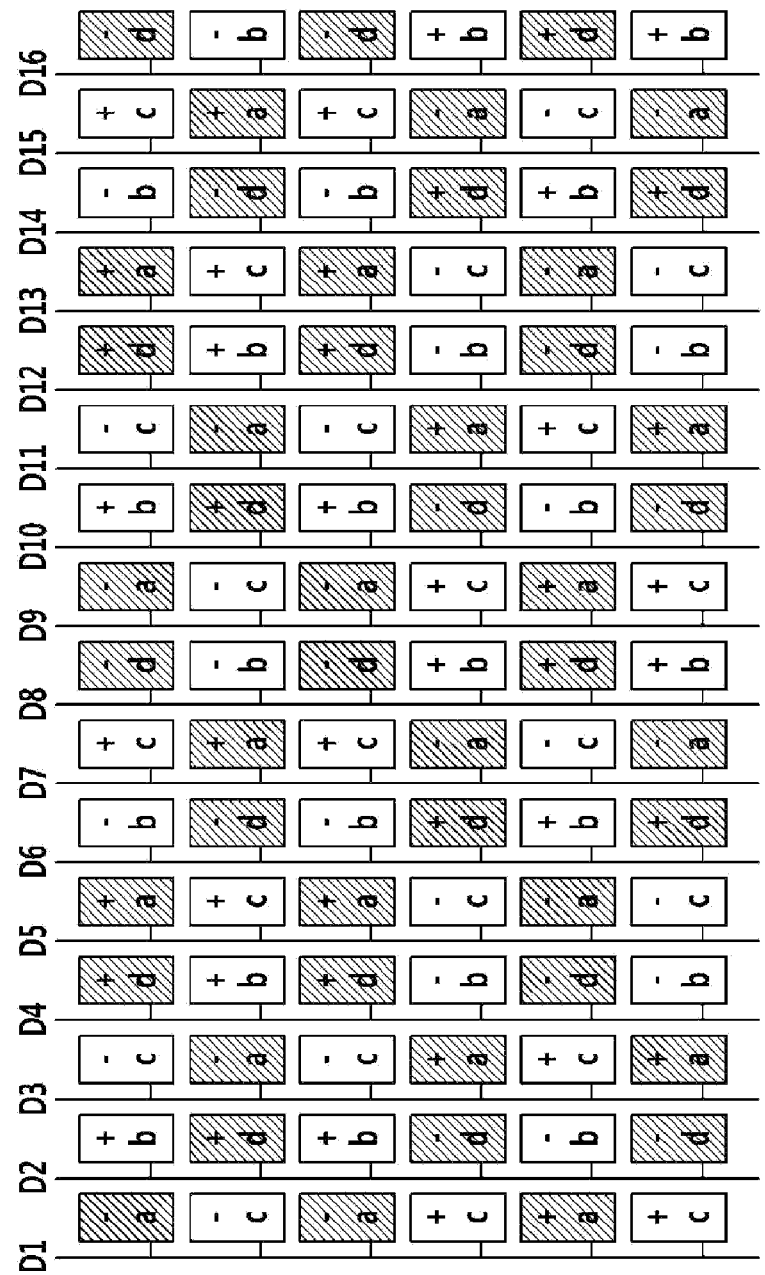

FIGS. 16 and 17 each illustrate the polarity dispositions of the n-th frame and the n+1-th frame at the time of displaying mixed color. For example, when "a", "b", "c", and "d" each are red, green, blue, and white, even though the polarities of the subpixels each representing the green b and the blue c are inverted in the n-th frame and the n+1-th frame, the number of positive (+) subpixels and negative (−) subpixels are alternately disposed in each frame. Therefore, even in the case of displaying mixed color, a difference in luminance does not occur between the frames.

Figure 18:
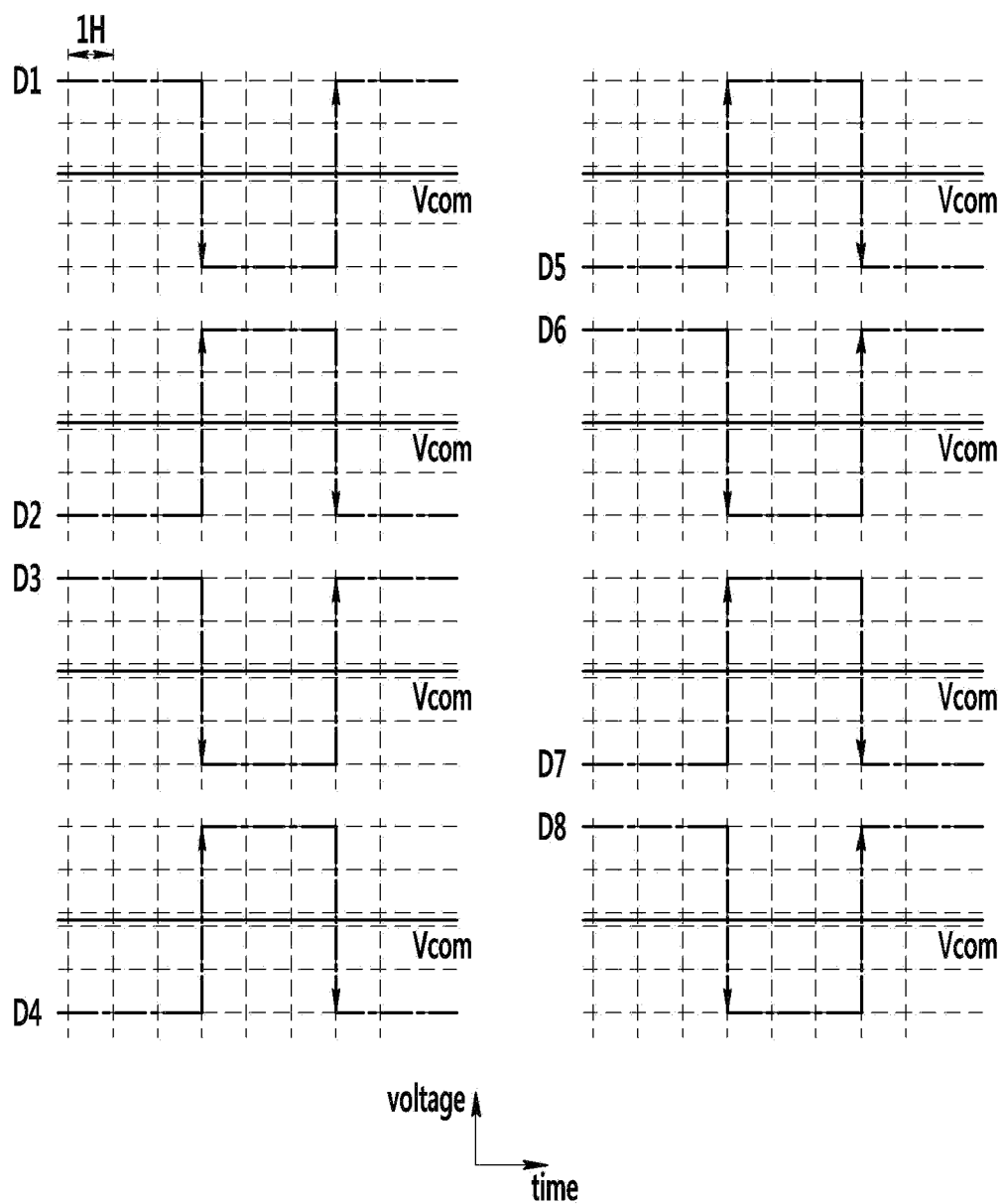
FIG. 18 to FIG. 20 are diagrams illustrating an example of a data voltage applied to a data line in the liquid crystal display according to the second exemplary embodiment of the present invention.
Figure 19:
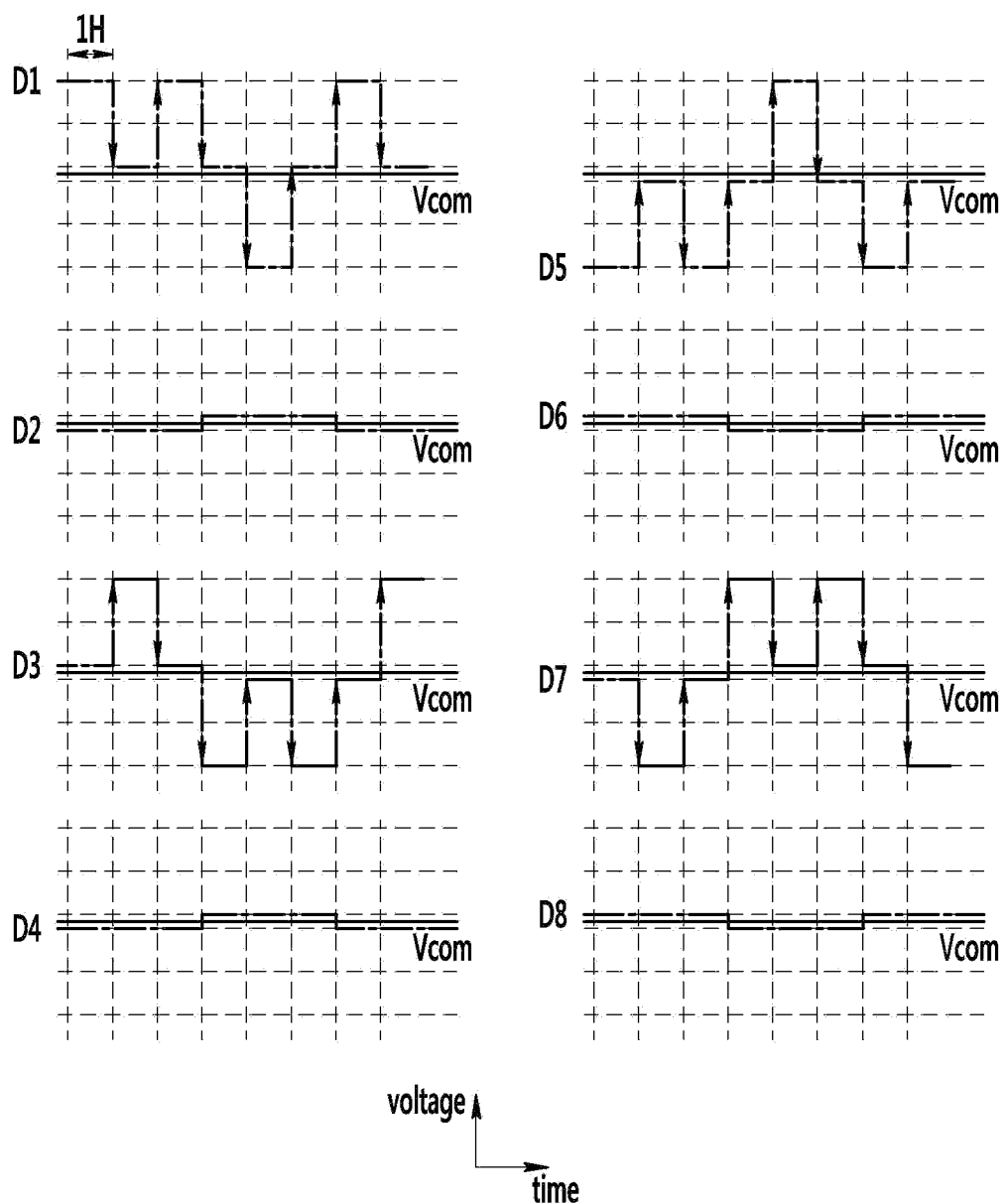
Figure 20:
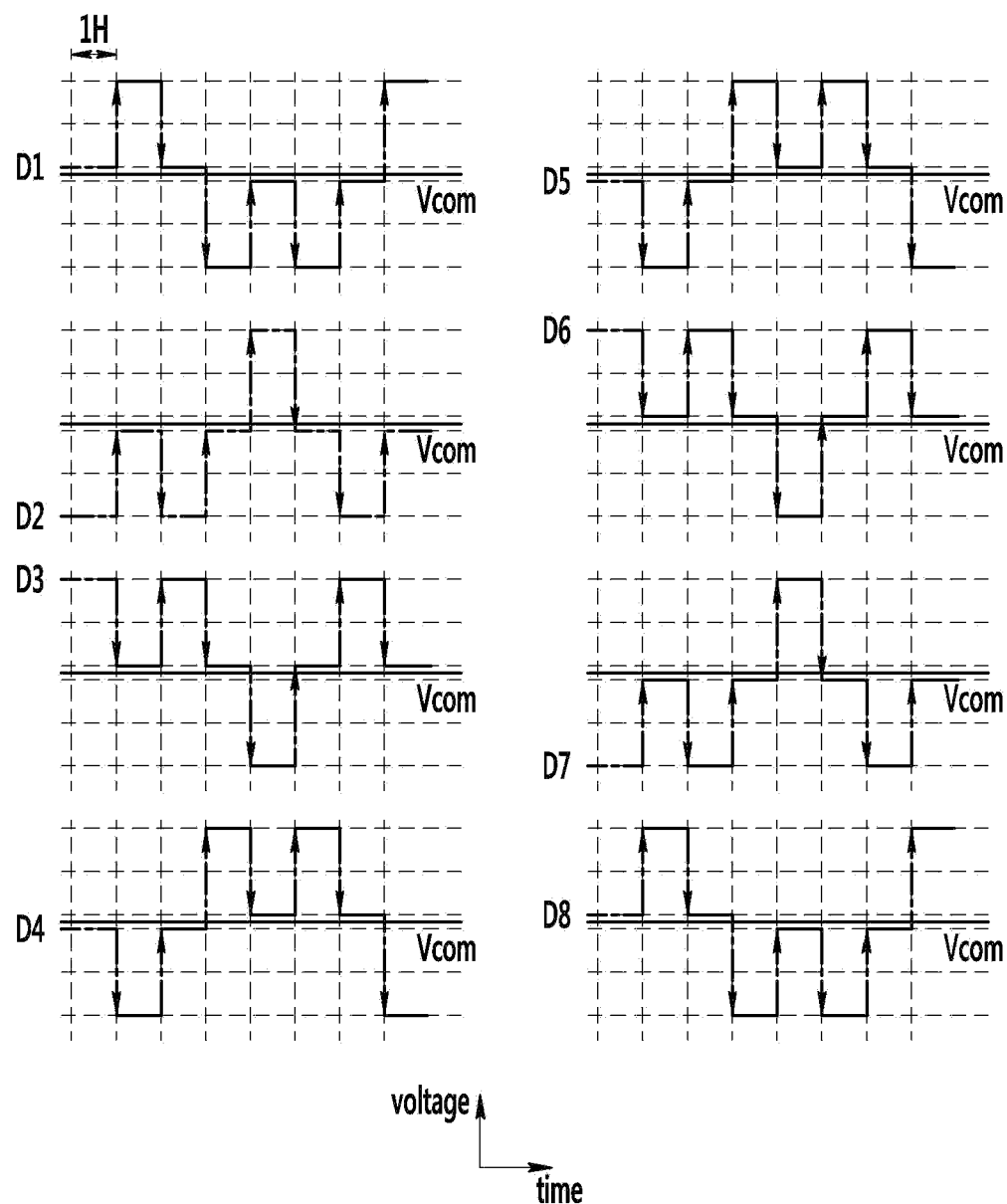

FIGS. 18 to 20 are diagrams illustrating an example of a data voltage applied to a data line in the liquid crystal display according to the second exemplary embodiment of the present invention.

FIG. 18 illustrates the data voltage applied to the data line when the same data voltage, for example, the maximum gray voltage is applied to all the subpixels. In FIGS. 18-20, one unit in the horizontal direction indicates one horizontal time period "1H". The voltage applied to the first data line D1 and the voltage applied to the second data line D2 have the same magnitude but an opposed polarity, and when one of the voltages rises the other thereof falls. Therefore, the voltages applied to the first and second data lines D1 and D2 are complementary. Similarly, the data voltages which are each applied to the third and fourth data lines D3 and D4, the fifth and sixth data lines D5 and D6, and the seventh and eighth data lines D7 and D8 are also complementary. Therefore, the data voltage is not biased to any one side and, therefore, does not affect the common voltage Vcom.

FIG. 19 illustrates the data voltage applied to the data line when the monochrome is displayed by applying the maximum gray voltage only to the subpixel of the color "a" (e.g., red) and the minimum gray voltage to the subpixels of the remaining colors. As illustrated in FIG. 19, the data voltage is complementarily applied to each pair of the first and fifth data lines D1 and D5, the second and sixth data lines D2 and D6, the third and seventh data lines D3 and D7, and the fourth and eighth data lines D4 and D8. Therefore, when the monochrome is displayed, the data voltage is not biased to any one side, but is instead balanced.

FIG. 20 illustrates the data voltage applied to the data line when a mixed color (e.g., cyan) is displayed by applying the maximum gray voltage to the subpixel of the color "b" (e.g., green) and the subpixel of the color "c" (e.g., blue) and applying the minimum gray voltage to the subpixels of the remaining colors. The data voltage is complementarily applied to the first and eighth data lines D1 and D8 and the fourth and fifth data lines D4 and D5. Further, the data voltage is complementarily applied to the second and seventh data lines D2 and D7 and the third and sixth data lines D3 and D6. Therefore, the data voltage is not biased to any one side and, therefore, does not affect the common voltage Vcom even at the time of displaying the mixed color.

FIGS. 21 to 26 are diagrams illustrating polarity dispositions of liquid crystal displays according to various other exemplary embodiments of the present invention.

Figure 21:
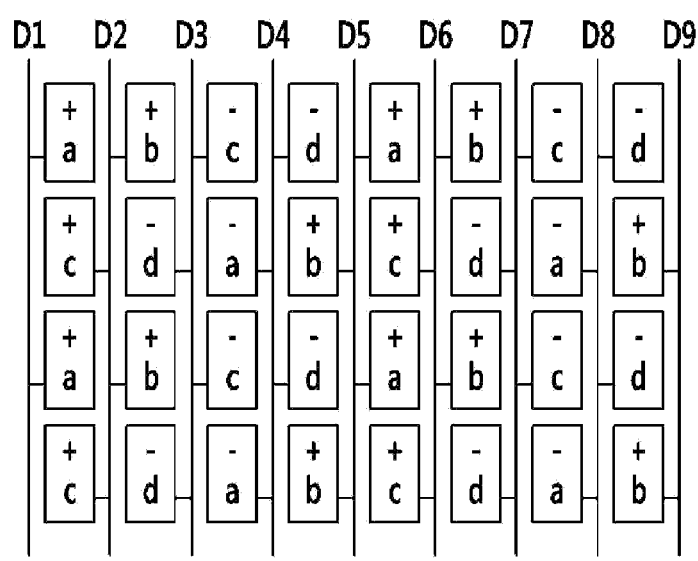

FIG. 21 illustrates the polarity disposition according to a third exemplary embodiment of the present invention. The data lines are alternately connected to the subpixels, which are located at the left and right thereof, one-by-one. In any frame (e.g., n-th frame), the positive (+) data voltage is applied to the first and second data lines D1 and D2, and the negative (−) data voltage is applied to the third and fourth data lines D3 and D4. The data voltage is repeatedly applied in the row direction based on four data lines as the basic unit. Therefore, the data voltages having the polarity applied to the first to fourth data lines D1 to D4 is also applied to the fifth to eighth data lines D5 to D8, respectively.

Because the data lines are alternately connected to the subpixels which are located at the right and left thereof, the positive (+) voltage is applied to all the subpixels of the first column, and the negative (−) voltage is applied to all the subpixels of the third column, but the positive (+) voltage and the negative (−) voltage are alternately applied to the subpixels of the second column, and the negative (−) voltage and the positive (+) voltage are alternately applied to the subpixels of the fourth column. The voltage having a polarity different from that of the voltage applied to the current frame is applied to each of the data lines in the next frame, and each subpixel also has the inverted polarity.

Figure 22:
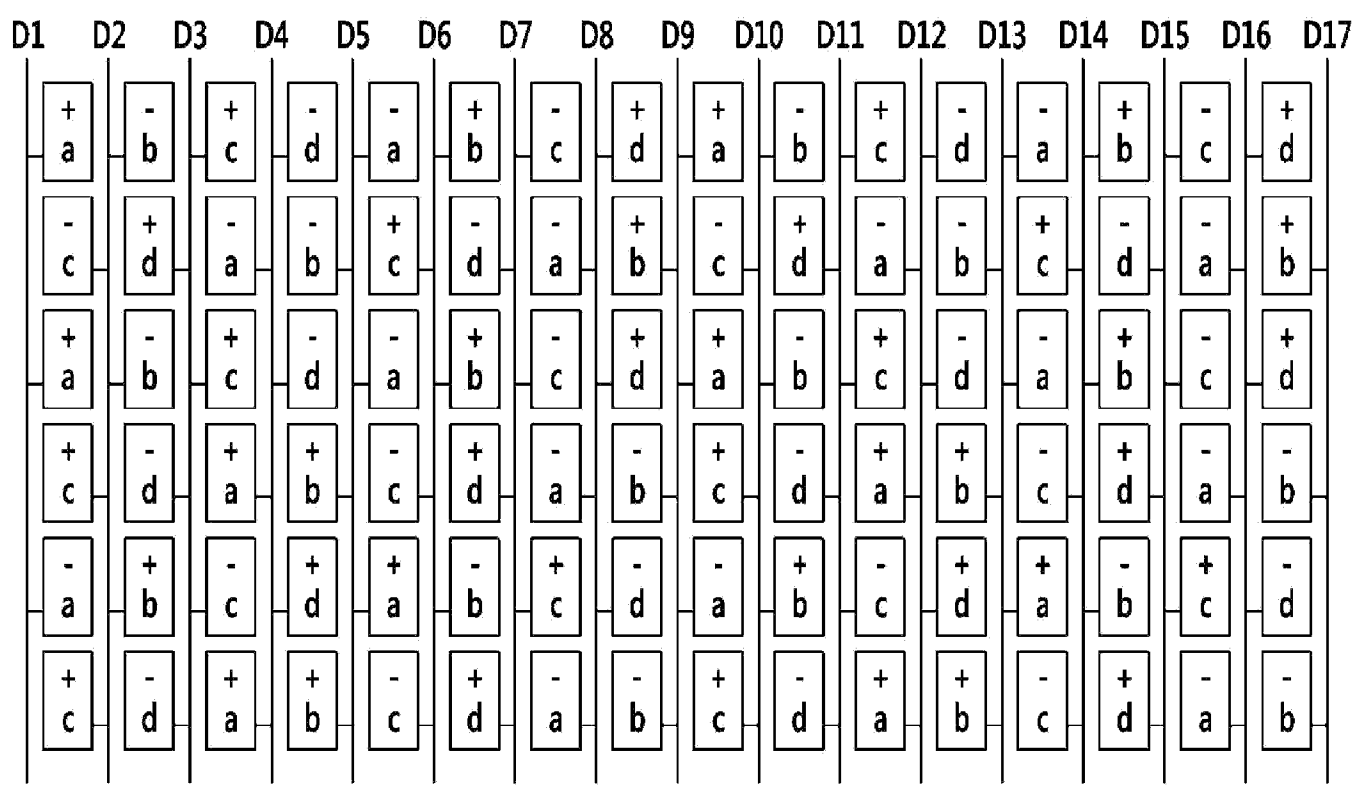

FIG. 22 illustrates the polarity disposition according to a fourth exemplary embodiment of the present invention. The data lines are alternately connected to the subpixels, which are located at the left and right thereof, one-by-one. In any frame, the positive (+) data voltage and the negative (−) data voltage are alternately applied to the first, third, sixth, and eighth data lines D1, D3, D6, and D8 for each three subpixels in the column direction, and the negative (−) data voltage and the positive (+) data voltage are alternately applied to the second, fourth, fifth and seventh data lines D2, D4, D5, and D7 for each three subpixels in the column direction. The data voltage is repeatedly applied in the row direction based on eight data lines as the basic unit, and the polarity of the data voltage applied to each data line is inverted for each frame.

Because the data lines are alternately connected to the subpixels which are located at the right and left thereof, the subpixels of the first to third columns and the fifth to seventh columns have the inverted polarity between the adjacent subpixels in each repetitive unit based on three subpixels as the repetitive unit, but the subpixels of the fourth and eighth columns have the inverted polarity for each three subpixels.

Figure 23:
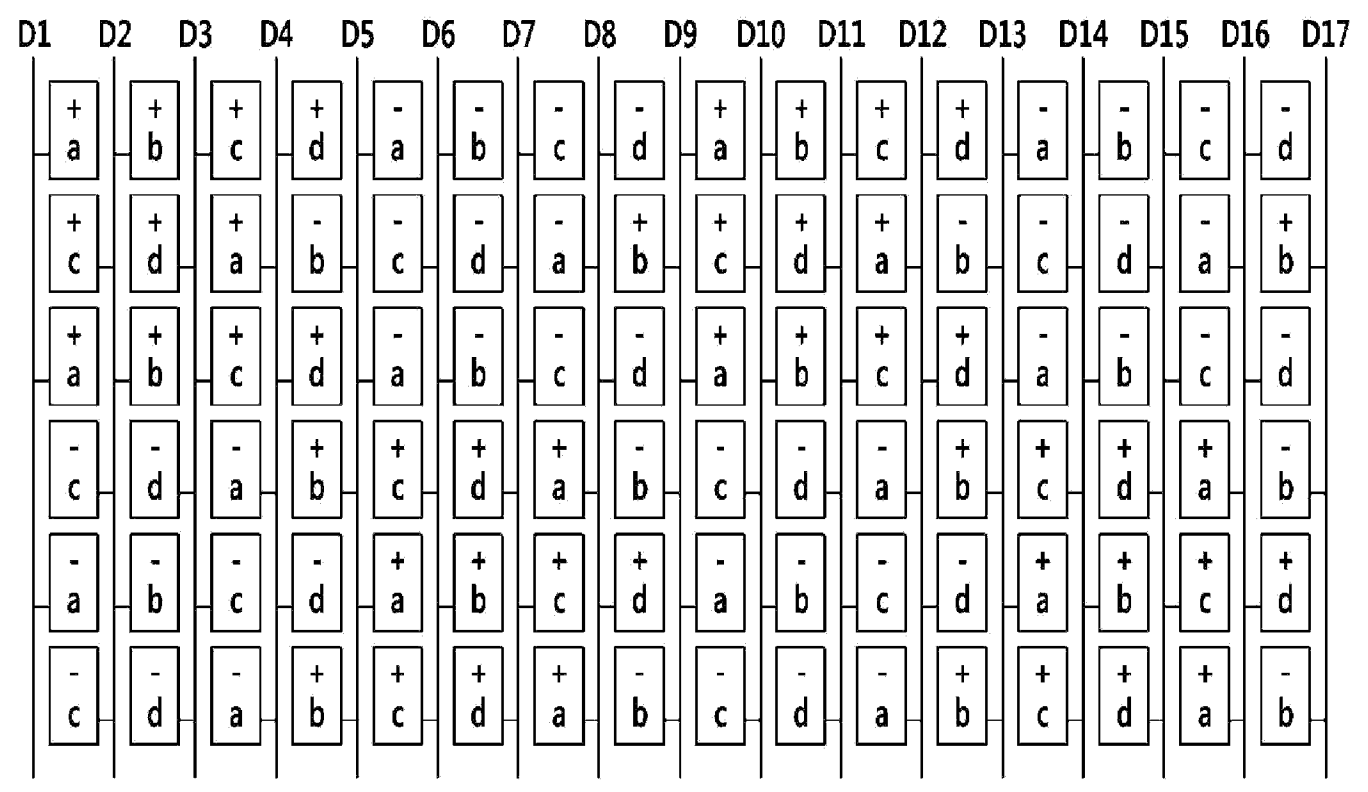

FIG. 23 illustrates the polarity disposition according to a fifth exemplary embodiment of the present invention. The data lines are alternately connected to the subpixels, which are located at the left and right thereof, one-by-one. In any frame, the positive (+) data voltage and the negative (−) data voltage are alternately applied to the first to fourth data lines D1 to D4 for each three subpixels in the column direction, and the negative (−) data voltage and the positive (+) data voltage are alternately applied to the fifth to eighth data lines D5 to D8 for each three subpixels in the column direction. The data voltage is repeatedly applied in the row direction based on eight data lines as the basic unit, and is inverted for each frame.

Because the data lines are alternately connected to the subpixels which are located at the right and left thereof, the subpixels of the first to third columns and the fifth to seventh columns have the inverted for each three subpixels, but the subpixels of the fourth and eighth columns have the inverted polarity between the adjacent subpixels in each repetitive unit based on three subpixels as the repetitive unit.

In the polarity dispositions according to the third to fifth exemplary embodiments, the number of positive (+) subpixels is the same as the number of negative (−) subpixels for each color, and the positive (+) subpixels and the negative (−) subpixels are alternately disposed in the row direction for each color. Further, when the white, monochrome, or mixed color is displayed, the voltage may be complementarily applied to the data line. Therefore, the difference in luminance resulting from polarity mismatching, or the ripple of the common voltage resulting from the polarity biasing does not occur.

FIG. 24 illustrates the polarity disposition according to a sixth exemplary embodiment of the present invention. The data lines are alternately connected to the subpixels, which are located at the left and right thereof, two-by-two. In any frame, the positive (+) data voltage is applied to the first and second data lines D1 and D2, and the negative (−) data voltage is applied to the third and fourth data lines D3 and D4. The data voltage is repeatedly applied in the row direction based on four data lines as the basic unit.

In the inversion driving as described above, because the data lines are alternately connected to the subpixels, which are located at the right and left thereof, two-by-two, the positive (+) voltage is applied to all the subpixels of the first column and the negative (−) voltage are alternately applied to all the subpixels of the third column, but the positive (+) voltage and the negative (−) voltage are alternately applied to the subpixels of the second column for each two subpixels in the column direction, and the negative (−) voltage and the positive (+) voltage are alternately applied to the subpixels of the fourth column for each two subpixels in the column direction. The voltage having a polarity different from that of the voltage applied to the current frame is applied to each of the data lines in the next frame, and each subpixel also has the inverted polarity.

FIG. 25 illustrates the polarity disposition according to a seventh exemplary embodiment of the present invention. The data lines are alternately connected to the subpixels, which are located at the left and right thereof, two-by-two. In any frame, the positive (+) data voltage and the negative (−) data voltage are alternately applied to the first to third data lines D1 to D3 for each four subpixels in the column direction, and the negative (−) data voltage and the positive (+) data voltage are alternately applied to the fourth to sixth data lines D4 to D6 for each four subpixels in the column direction. The data voltage is repeatedly applied in the row direction based on six data lines as the basic unit, and is inverted in each frame. The polarities of the subpixels of each column are inverted for each four subpixels, but the polarities of the subpixels of the third column and the sixth column are inverted at a period different from that of the subpixels of other columns.

FIG. 26 illustrates the polarity disposition according to an eighth exemplary embodiment of the present invention. The data lines are alternately connected to the subpixels, which are located at the left and right thereof, two-by-two. In any frame, the positive (+) data voltage is applied to the first to third data lines D1 to D3 and the negative (−) data voltage is applied to the fourth to sixth data lines D4 to D6. The data voltage is repeatedly applied in the row direction based on six data lines as the basic unit. As a result, the positive (+) data voltage is alternately applied to the subpixels of the first and second columns, the negative (−) data voltage is alternately applied to the subpixels of the fourth and fifth columns, the positive (+) data voltage and the negative (−)

data voltage are alternately applied to the subpixels of the third column for each two subpixels, and the negative (−) data voltage and the positive (+) data voltage are alternately applied to the subpixels of the sixth column for each two subpixels. In the next frame, the data voltage having different polarities is applied to each subpixel.

In the polarity dispositions according to the sixth to eighth exemplary embodiments, there is a row in which the positive (+) subpixel and the negative (−) subpixel representing the same color are not alternately disposed, but the number of positive (+) subpixels is the same as the number of negative (−) subpixels for each color, and, therefore, the positive and negative subpixels are overall balanced.

Further, when white, monochrome, or a mixed color is displayed, the voltage may be applied to the data lines in a complementary manner. Therefore, the difference in luminance resulting from the polarity mismatching does not substantially occur, and the ripple of the common voltage resulting from polarity biasing does not occur.

Figure 27:
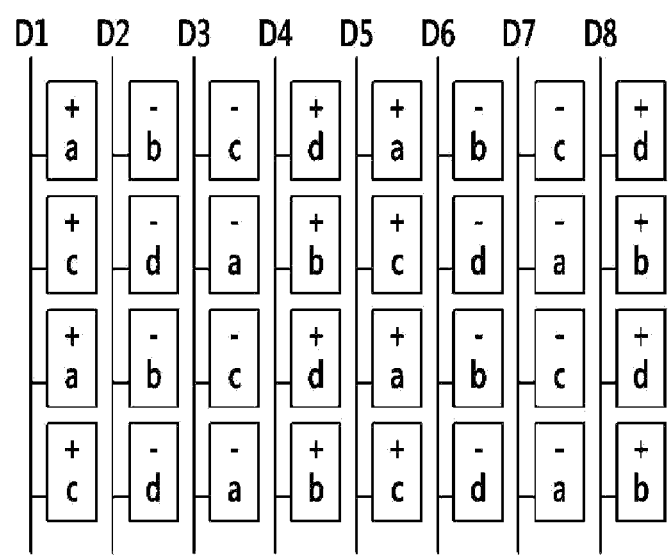
FIG. 27 and FIG. 28 are diagrams illustrating an example of a polarity disposition of the liquid crystal display in which polarity biasing of the data voltage occurs and the data voltage applied to a data line.
Figure 28:
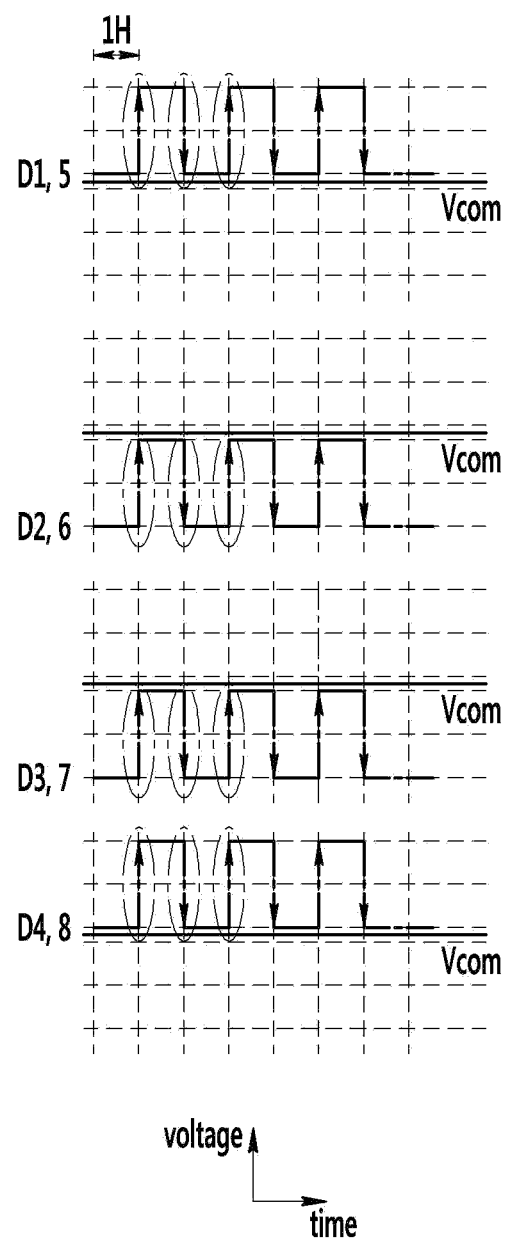

FIGS. 27 and 28 are diagrams illustrating an example of a polarity disposition of the liquid crystal display in which polarity biasing of the data voltage occurs.

Referring to FIG. 27, each of the data lines is connected only to the subpixel which is located at the right thereof. In any frame, the positive (+) data voltage is applied to the first and fourth data lines, and the negative (−) data voltage is applied to the second and third data lines. The data voltage is repeatedly applied in the row direction based on six data lines as the basic unit, and is inverted for each frame.

In the polarity disposition, ripple may occur in the common voltage as a result of polarity biasing. For example, FIG. 28 illustrates that in the subpixel disposition structure of FIG. 27, in which the minimum gray voltage is applied to the subpixels of the colors "a" and "d" so as to display the mixed color, and the maximum gray voltage is applied to the colors "b" and "c". In FIG. 28, one unit in the horizontal direction indicates one horizontal time period "1H". As illustrated in FIG. 28, the voltage applied to any data line is not complementary, and when the voltage of any one data line rises, the voltage of the remaining data lines also rises, and when the voltage of any one data line falls, the voltage of the remaining data lines also falls. Therefore, polarity biasing of the data voltage occurs and, therefore, a ripple phenomenon in which the common voltage is undesirably moved as a result of polarity biasing may occur. This may lead to the deterioration in image quality. Depending on the polarity disposition according to exemplary embodiments of the present invention, a ripple phenomenon of the common voltage or the deterioration in image quality as a result of polarity biasing does not occur.

It will be apparent to those skilled in the art that various modifications and variations can be made in the present invention without departing from the spirit or scope of the invention. Thus, it is intended that the present invention cover the modifications and variations of this invention, provided they come within the scope of the appended claims and their equivalents.

What is claimed is:

1. A liquid crystal display, comprising:
   gate lines arranged in a row direction;
   data lines arranged in a column direction;
   a data driver configured to transmit data voltages to the data lines; and
   subpixels connected to the gate lines and the data lines, and continuously arranged in basic units of eight subpixels along the row direction,
   wherein:
   in each of the basic units, voltage polarities between adjacent subpixels from a first subpixel to a fourth subpixel along the row are opposite to each other, voltage polarities between adjacent subpixels from a fifth subpixel to an eighth subpixel along the row are opposite to each other, and voltage polarities of the fourth subpixel and the fifth subpixel are the same;
   the data lines are configured to apply the same voltage polarity to subpixels in the same column for one frame;
   four subpixels are disposed in a set order in a repeated manner in the row direction;
   at least two of the four subpixels are configured to display the same color; and
   the first to eighth subpixels are connected to a same gate line.

2. The liquid crystal display of claim 1, wherein each of the data lines is connected to the same side of the subpixels.

3. The liquid crystal display of claim 2, wherein each pixel comprises an even number of subpixels.

4. The liquid crystal display of claim 3, wherein a group of four subpixels defines one pixel.

5. A method for driving a liquid crystal display comprising subpixels that are respectively connected to gate lines arranged in a row direction and data lines arranged in a column direction, the subpixels being continuously arranged in basic units of eight subpixels along the row direction, comprising:
   applying data voltages, which have opposite polarities between adjacent subpixels in the row direction, to data lines connected to first to fourth subpixels in the row direction;
   applying data voltages, which have opposite polarities between adjacent subpixels in the row direction, to data lines connected to fifth to eighth subpixels in the row direction; and
   applying data voltages having the same polarity to the data lines connected to the fourth and fifth subpixels in the row direction,
   wherein:
   data voltages having the same voltage polarity for one frame are applied to each of the data lines;
   four subpixels are disposed in a set order in a repeated manner in the row direction;
   at least two of the four subpixels are configured to display the same color; and
   the first to eighth subpixels are connected to a same gate line.

6. The driving method of claim 5, wherein each of the data lines is connected to the same side of the subpixels.

7. The driving method of claim 6, wherein data voltages having opposite voltage polarities for each group of three subpixels in the column direction are applied to each of the data lines.

* * * * *